United States Patent
Farley et al.

(10) Patent No.: US 12,470,626 B2
(45) Date of Patent: Nov. 11, 2025

(54) LCS-NVME/TCP STORAGE TARGET SYSTEM

(71) Applicant: Dell Products L.P., Round Rock, TX (US)

(72) Inventors: Douglas Lang Farley, Round Rock, TX (US); Shyamkumar T. Iyer, Cedar Park, TX (US); Prakash Nara, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 18 days.

(21) Appl. No.: 18/426,437

(22) Filed: Jan. 30, 2024

(65) Prior Publication Data

US 2025/0247448 A1    Jul. 31, 2025

(51) Int. Cl.
*H04L 67/1097* (2022.01)
*H04L 67/146* (2022.01)
*H04L 67/61* (2022.01)

(52) U.S. Cl.
CPC ........ *H04L 67/1097* (2013.01); *H04L 67/146* (2013.01); *H04L 67/61* (2022.05)

(58) Field of Classification Search
CPC ...... G06F 3/067; G06F 3/0604; G06F 3/0659; G06F 3/0635; H04L 67/1097
See application file for complete search history.

(56) References Cited

U.S. PATENT DOCUMENTS

| | | | | |
|---|---|---|---|---|
| 10,901,636 B2 * | 1/2021 | Enz | ...................... | G06F 13/1668 |
| 11,301,140 B2 * | 4/2022 | Cayton | .................... | G06F 3/067 |
| 11,301,398 B2 * | 4/2022 | Smith | ................. | G06F 13/4027 |
| 2006/0271598 A1 | 11/2006 | Wong et al. | | |
| 2015/0317088 A1 * | 11/2015 | Hussain | ................ | G06F 3/0688 |
| | | | | 711/103 |
| 2022/0027051 A1 * | 1/2022 | Kant | ...................... | G06F 3/0617 |
| 2022/0286377 A1 * | 9/2022 | Smith | .................... | G06F 3/0604 |
| 2024/0370172 A1 * | 11/2024 | Sajeepa | ................. | G06F 3/0614 |

* cited by examiner

*Primary Examiner* — Chirag R Patel
(74) *Attorney, Agent, or Firm* — Joseph Mencher

(57) ABSTRACT

An LCS/NVMe/TCP storage target system includes a storage system having a storage controller, host systems that are coupled to the storage system, and a resource management system that is coupled to the storage system and the host systems. The resource management system provides a first LCS using a first host system, and configures the first host system and the storage controller to present a first namespace provided by the storage system to the first LCS via first Host NVMe Qualified Name(s) (HNQN(s)). The resource management system then moves the first LCS to a second host system, removes the first HNQN(s) from the storage controller and the first host system, and configures the second host system and the storage controller to present the first namespace provided by the storage system to the first LCS via second HNQN(s).

20 Claims, 28 Drawing Sheets

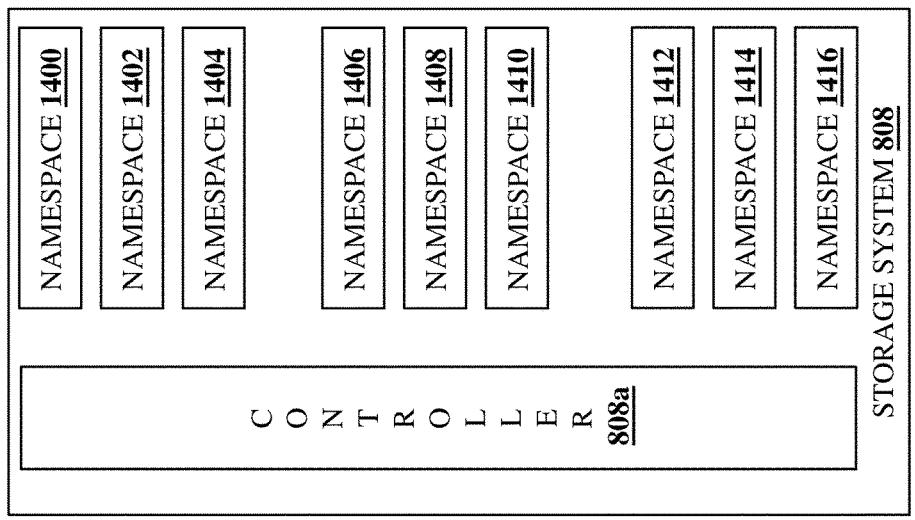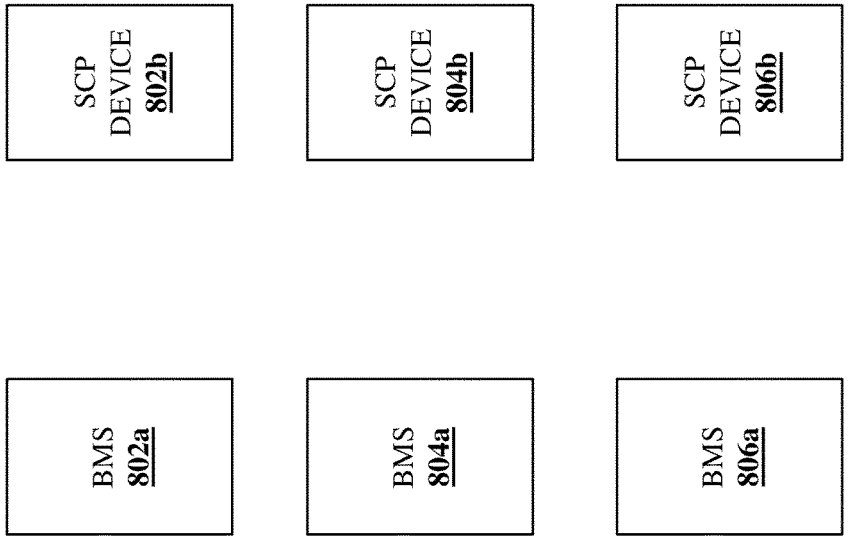
FIG. 14

LCS-NVME/TCP STORAGE TARGET SYSTEM

BACKGROUND

The present disclosure relates generally to information handling systems, and more particularly to providing storage for Logically Composed Systems (LCSs) using Non-Volatile Memory express (NVMe)/Transmission Control Protocol (TCP) storage targets.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, may be used to provide users with Logically Composed Systems (LCSs) that include logical systems that perform workloads using the components in one or more server devices. One potential option for data storage for such LCSs includes Non-Volatile Memory express (NVMe)/Transmission Control Protocol (TCP) storage targets (e.g., NVMe storage namespaces and/or other NVMe/TCP storage target known in the art) that may be provided via an NVM storage system such as an Ethernet "Bunch Of Flash" (eBOF) storage system, a POWERFLEX® storage system available from DELL® Inc. of Round Rock, Texas, United States, and/or other Non-Volatile Memory (NVM) storage systems known in the art. However, such NVMe/TCP storage targets are conventionally designed for static assignment to physical hosts, and issues can arise when any particular LCS or other virtual host in a "current/first" NVMe/TCP session with an NVMe/TCP storage target attempts to initiate a "new/second" NVMe/TCP session with that NVMe/TCP storage target due to, for example, that LCS moving from a first server device to a second server device.

Accordingly, it would be desirable to provide an LCS-NVMe/TCP storage target system that addresses the issues discussed above.

SUMMARY

According to one embodiment, an Information Handling System (IHS) includes a resource management processing system; and a resource management memory system that is coupled to the resource management processing system and that includes instructions that, when executed by the resource management processing system, cause the resource management processing system to provide a resource management engine that is configured to: provide a first Logically Composed System (LCS) using a first host system that is coupled to the resource management processing system; configure the first host system and a storage controller in a storage system that is coupled to the resource management processing system to present a first namespace provided by the storage system to the first LCS via at least one first Host NVMe Qualified Name (HNQN); move the first LCS to a second host system that is coupled to the resource management processing system; remove the at least one first HNQN from the storage controller and the first host system; and configure the second host system and the storage controller to present the first namespace provided by the storage system to the first LCS via at least one second HNQN.

BRIEF DESCRIPTION OF THE DRAWINGS

FIG. 14 is a schematic view illustrating an embodiment of the LCS provisioning system of FIG. 8 operating during the method of FIG. 7.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
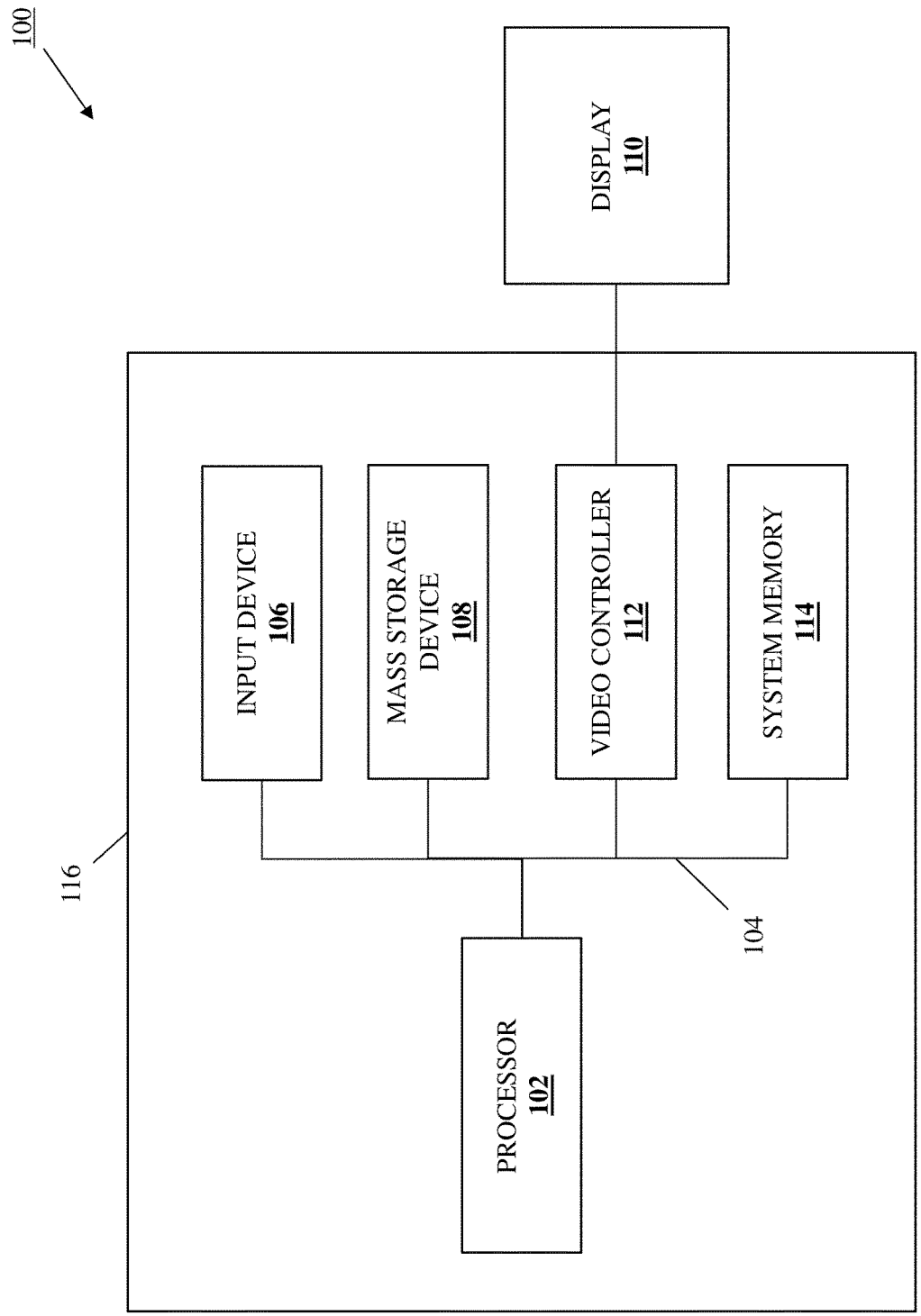
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the Logically Composed System (LCS)-Non-Volatile Memory express (NVMe)/Transmission Control Protocol (TCP) storage target systems and methods of the present disclosure may be utilized with Logically Composed Systems (LCSs), which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
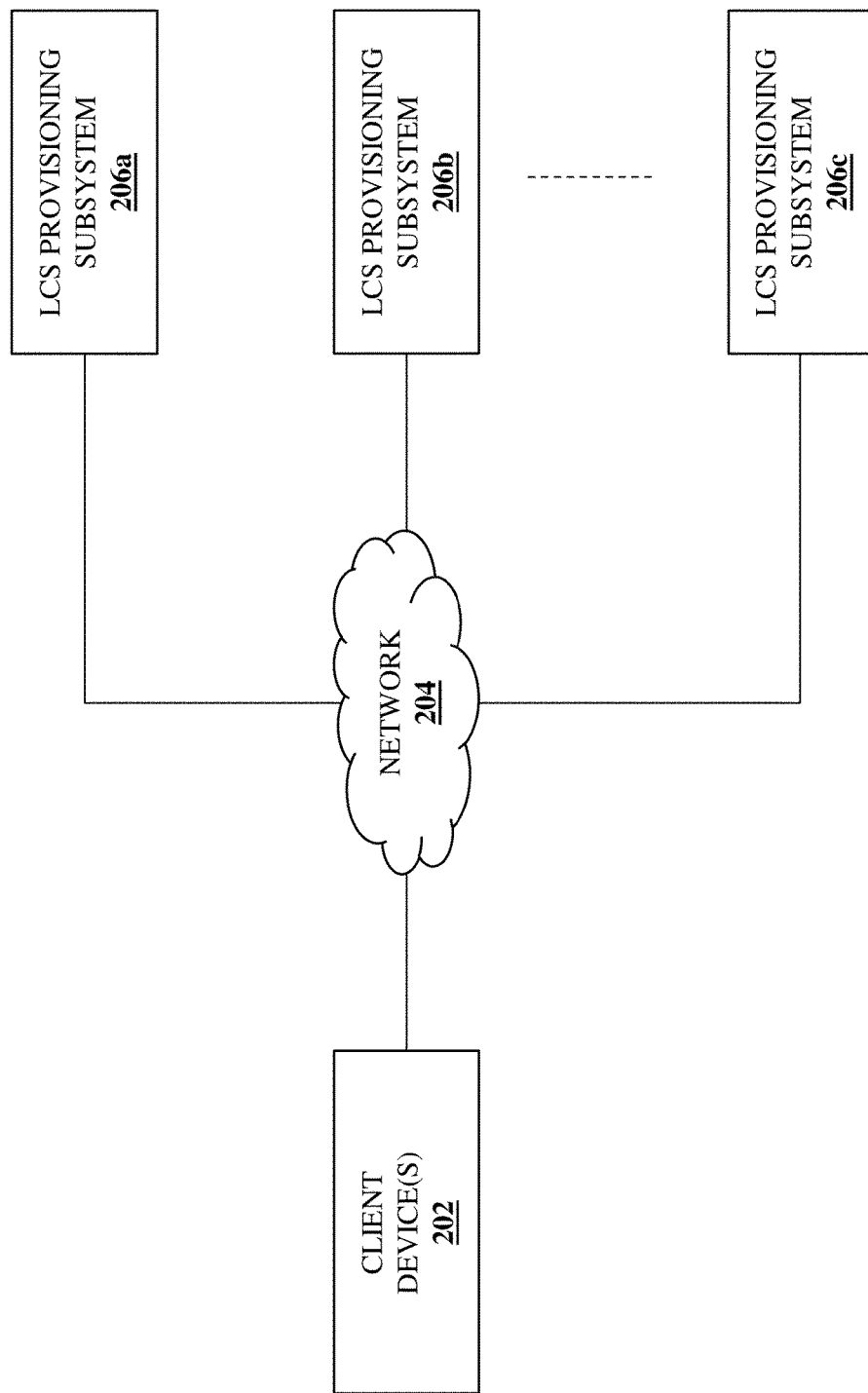
FIG. 2 is a schematic view illustrating an embodiment of an LCS provisioning system.

With reference to FIG. 2, an embodiment of a Logically Composed System (LCS) provisioning system 200 is illustrated that may be utilized with the LCS-NVMe/TCP storage target systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below. In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
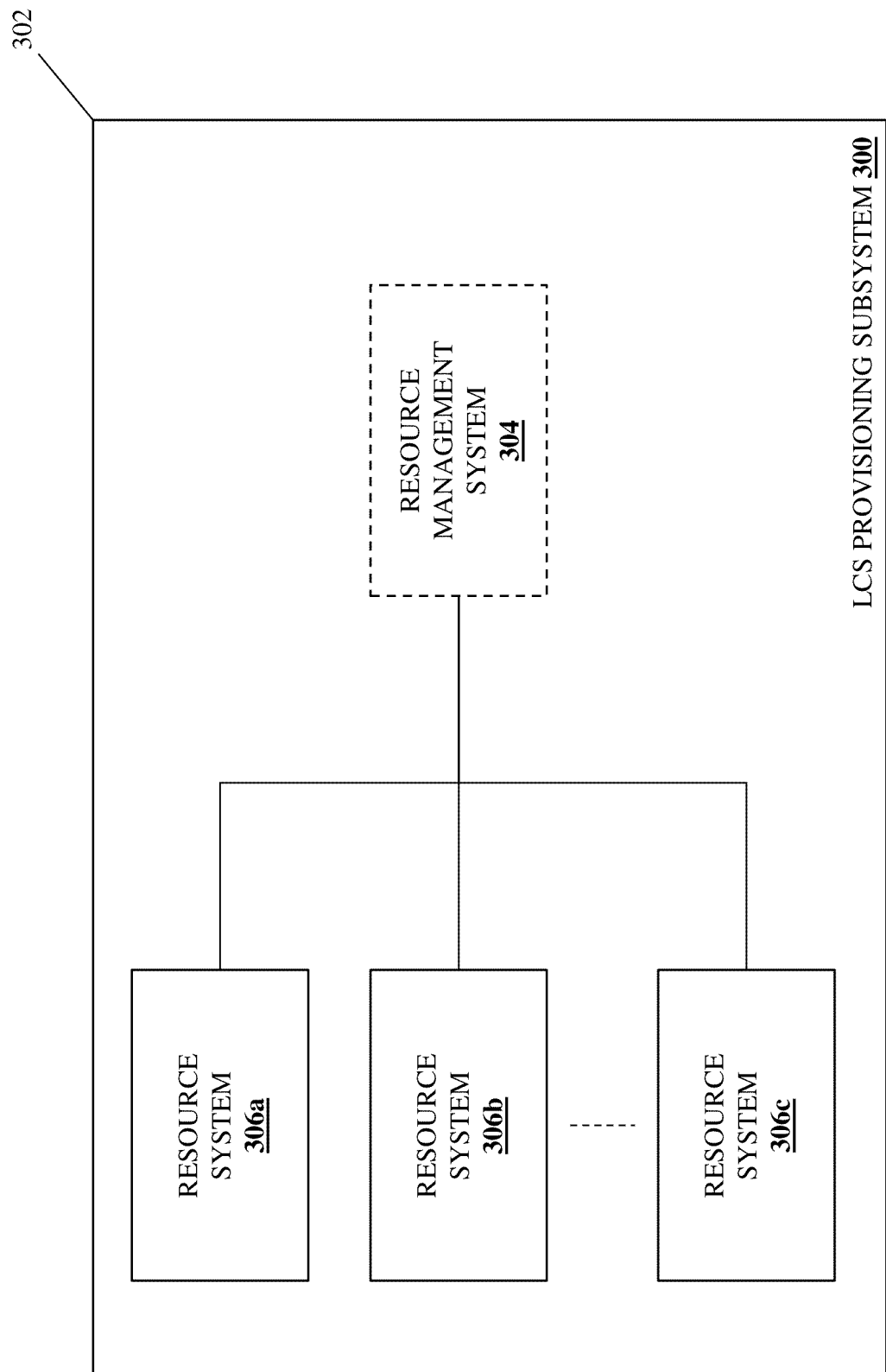
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include a System Control Processor (SCP) device that may be conceptualized as an "enhanced" SmartNIC device that may be configured to perform functionality that is not available in conventional SmartNIC devices such as, for example, the resource management functionality, LCS provisioning functionality, and/or other SCP functionality described herein.

In an embodiment, any of the resource systems 306a-306c may include any of the resources described below coupled to an SCP device that is configured to facilitate management of those resources by the resource management system 304. Furthermore, the SCP device included in the resource management system 304 may provide an SCP Manager (SCPM) subsystem that is configured to manage the SCP devices in the resource systems 306a-306c, and that performs the functionality of the resource management system 304 described below. In some examples, the resource management system 304 may be provided by a "stand-alone" system (e.g., that is provided in a separate chassis from each of the resource systems 306a-306c), and the SCPM subsystem discussed below may be provided by a dedicated SCP device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem may be provided by an SCP device, processing/memory resources, and/or any other any other components om that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices in the resource systems 306a-306c may operate to "elect" or otherwise select one or more of those SCP devices to operate as the SCPM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
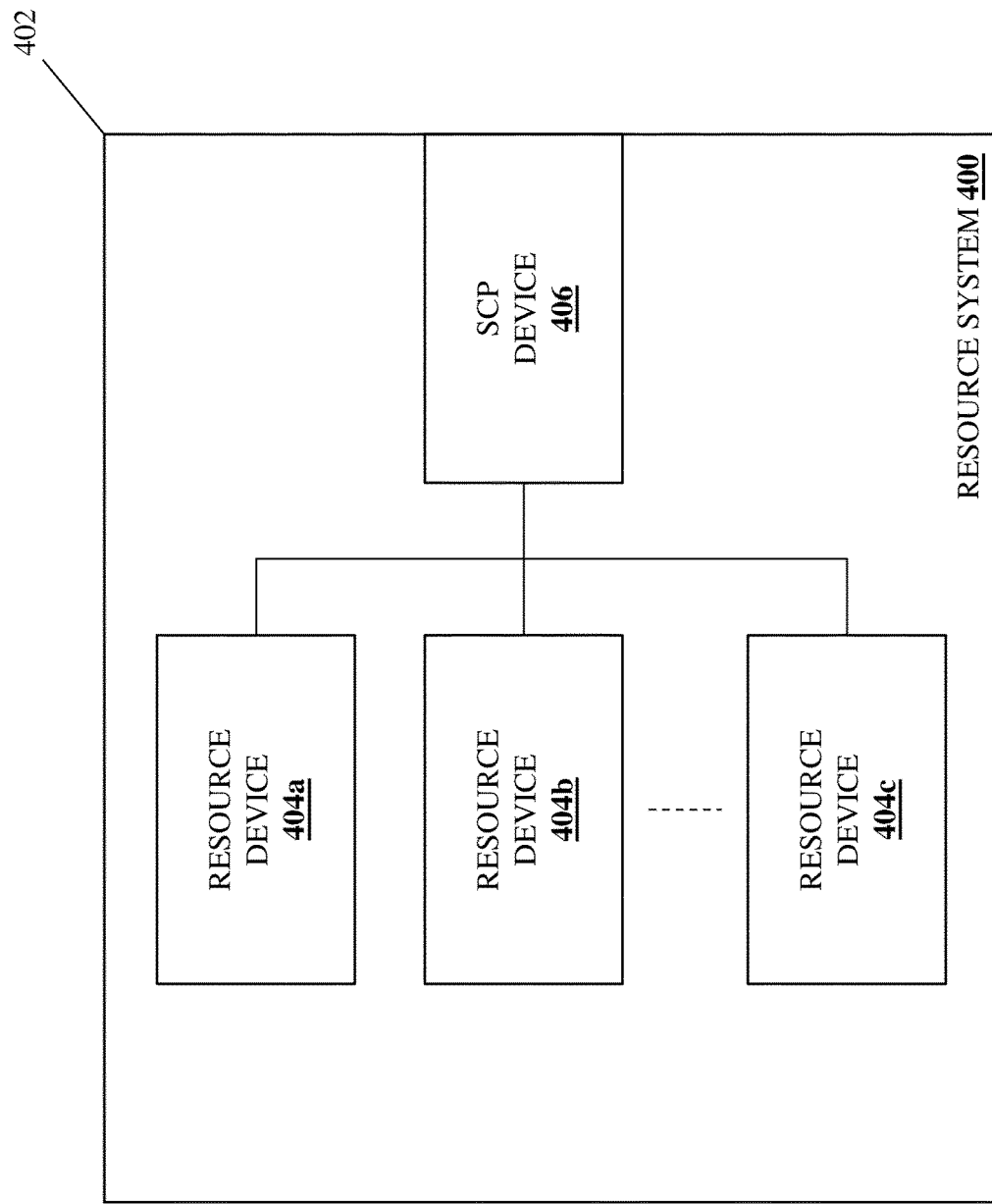
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406. In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM)

devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may operate to provide a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. Further, as discussed below, the SCP devices describe herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciate that functionality described herein may be enabled on other devices while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406.

However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
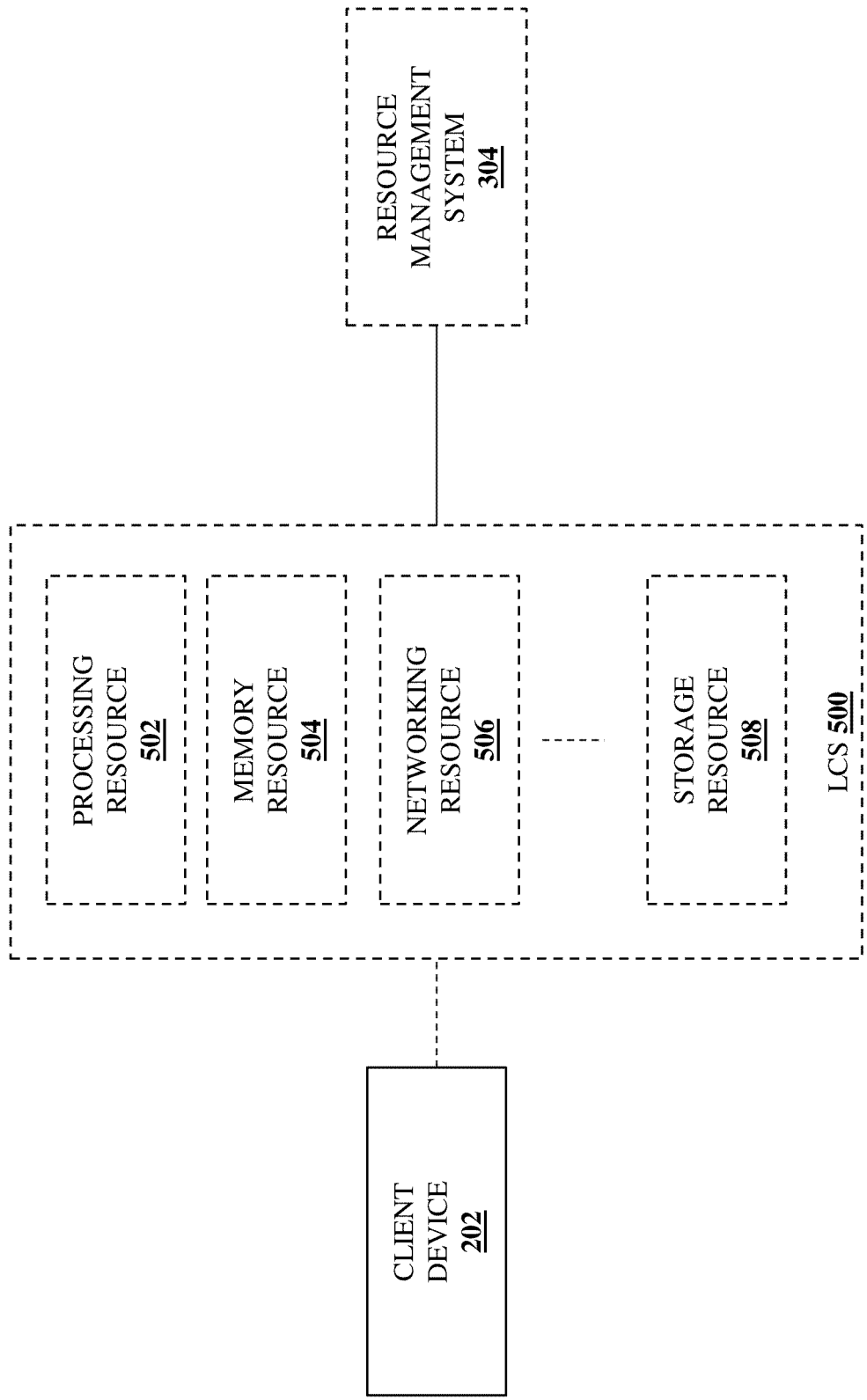
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TBs of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TBs of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
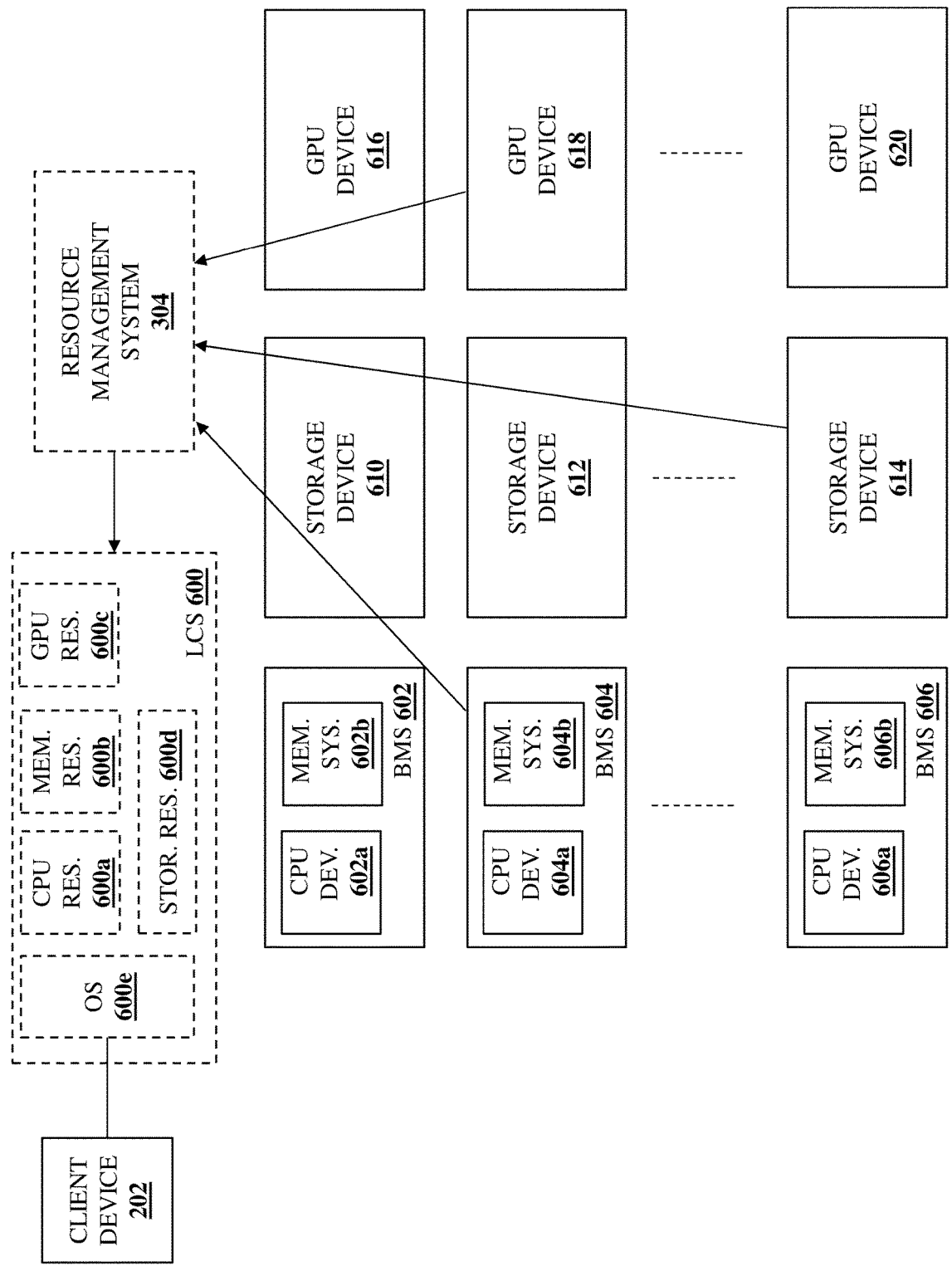
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) 602 having a Central Processing Unit (CPU) device 602a and a memory system 602b, a BMS 604 having a CPU device 604a and a memory system 604b, and up to a BMS 606 having a CPU device 606a and a memory system 606b. Furthermore, one or more of the resource systems 306a-306c includes resource devices 404a-404c provided by a storage device 610, a storage device 612, and up to a storage device 614. Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600a that utilize the CPU device 604a in the BMS 604, and memory resources 600b that utilize the memory system 604b in the BMS 604. Furthermore, the resource management system 304 may compose the LCS 600 using the storage device 614 to provide the LCS 600 with storage resources 600d, and using the GPU device 318 to provide the LCS 600 with GPU resources 600c. As illustrated in the specific example in FIG. 6, the CPU device 604a and the memory system 604b in the BMS 604 may be configured to provide an operating system 600e that is presented to the client device 202 as being provided by the CPU resources 600a and the memory resources 600b in the LCS 600, with operating system 600e utilizing the GPU device 618 to provide the GPU resources 600c in the LCS 600, and utilizing the storage device 614 to provide the storage resources 600d in the LCS 600. The user of the client device 202 may then provide any application(s) on the operating system 600e provided by the CPU resources 600a/CPU device 604a and the memory resources 600b/memory system 604b in the LCS 600/BMS 604, with the application(s) operating using the CPU resources 600*a*/CPU device 604*a*, the memory resources 600*b*/memory system 604*b*, the GPU resources 600*c*/GPU device 618, and the storage resources 600*d*/storage device 614.

Furthermore, as discussed above, the SCP device(s) 406 in the resource systems 306*a*-306*c*/400 that allocates any of the CPU device 604*a* and memory system 604*b* in the BMS 604 that provide the CPU resource 600*a* and memory resource 600*b*, the GPU device 618 that provides the GPU resource 600*c*, and the storage device 614 that provides storage resource 600*d*, may also allocate SCP hardware and/or perform enhanced functionality (e.g., the enhanced storage functionality in the specific examples provided above) for any of those resources that may otherwise not be available in the CPU device 604*a*, memory system 604*b*, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600*c* may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600*a*, the memory resources 600*b*, the GPU resources 600*c*, and the storage resources 600*d*, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being underutilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

As discussed above, one potential option for data storage for LCSs includes Non-Volatile Memory express (NVMe)/Transmission Control Protocol (TCP) storage targets (e.g., NVMe storage namespaces and/or other NVMe/TCP storage targets known in the art) that may be provided via an NVM storage system such as an Ethernet "Bunch Of Flash" (eBOF) storage system, a POWERFLEX® storage system available from DELL® Inc. of Round Rock, Texas, United States, and/or other NVM storage systems known in the art. However, such NVMe/TCP storage targets are conventionally designed for static assignment to physical hosts, and issues can arise when any particular LCS or other virtual host in a "current/first" NVMe/TCP session with an NVMe/TCP storage target attempts to initiate a "new/second" NVMe/TCP session with that NVMe/TCP storage target due to, for example, that LCS moving from a first server device to a second server device. As such, the inventors of the present disclosure have developed the LCS-NVMe/TCP storage target systems and methods discussed below that enable the provisioning of data storage to LCSs via NVMe/TCP storage targets without the issues discussed above.

Figure 7:
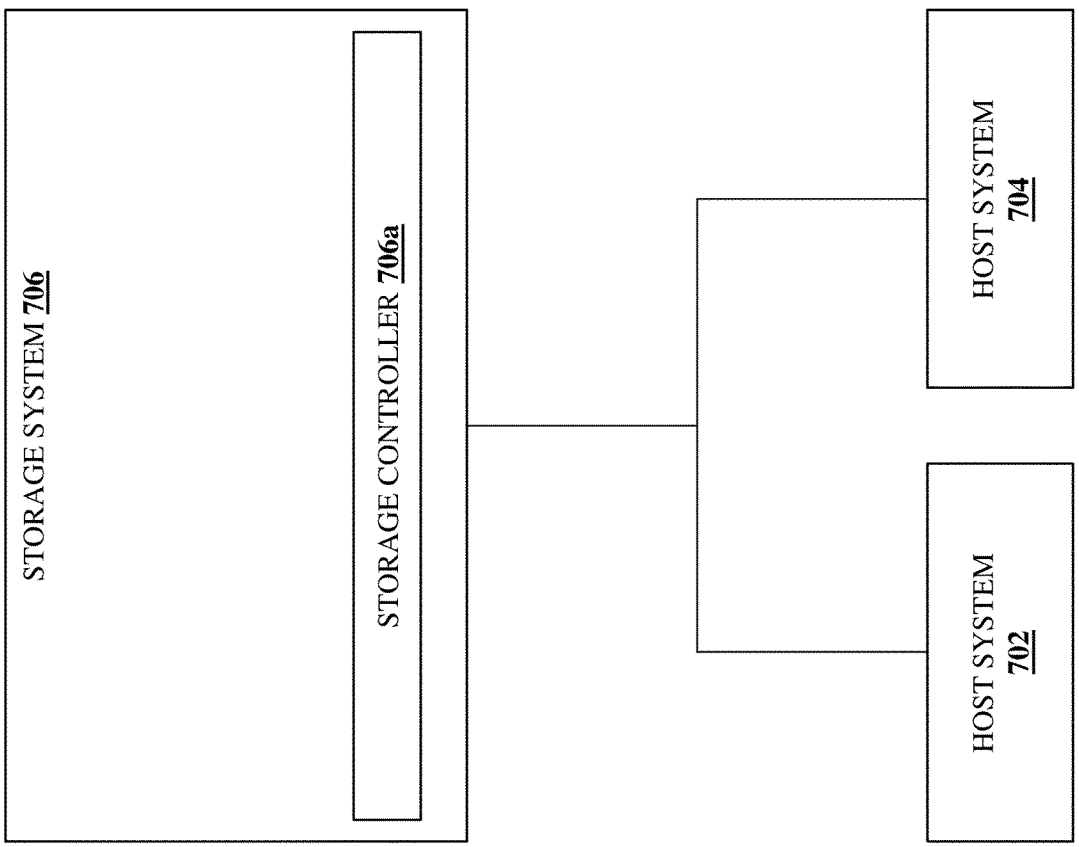
FIG. 7 is a schematic view illustrating an embodiment of an LCS provisioning system that may provide the LCS-NVMe/TCP storage target system of the present disclosure.

Referring now to FIG. 7, an embodiment of an LCS provisioning system 700 is illustrated that may provide the LCS-NVMe/TCP storage target system of the present disclosure. In the illustrated embodiment, the LCS provisioning system 700 includes a pair of host systems 702 and 704. In an embodiment, either or both of the host systems 702 and 704 may be provided by the IHS 100 discussed above with reference to FIG. 1, and/or may include some or all of the components of the IHS 100, and in specific examples may be provided by any of the resource systems 306*a*-306*c* discussed above with reference to FIG. 3, the resource system 400 discussed above with reference to FIG. 4, and/or the BMSs 602-606 discussed above with reference to FIG. 6. However, while illustrated and discussed as being provided by specific server devices and/or resource systems, one of skill in the art in possession of the present disclosure will recognize that host systems provided in the LCS-NVMe/TCP storage target system of the present disclosure may include any devices that may be configured to operate similarly as the host systems 702 and 704 discussed below.

As illustrated, the LCS provisioning system 700 also includes a storage system 706 that includes a storage controller 706*a* and that is coupled to each of the host system 702 and 704. In an embodiment, the storage system 706 may include an NVM storage system such as the eBOF storage system, POWERFLEX® storage system available from DELL® Inc. of Round Rock, Texas, United States, and/or other NVM storage systems discussed above that one of skill in the art in possession of the present disclosure will recognize as capable of providing the NVMe/TCP storage targets discussed below.

While not illustrated in FIG. 7, one of skill in the art in possession of the present disclosure will appreciate how a resource management system may be coupled to the storage system 706 and the host systems 702 and 704 similarly as described above, and thus may be provided the resource management system 304 discussed above with reference to FIG. 3 (e.g., an SCPM subsystem as described above). In an embodiment, that resource management system may include a resource management memory system that includes instruction that, when executed by a resource management processing system in the resource management system, cause the resource management processing system to provide a resource management engine that is configured to perform the functionality of the resource management engines, resource management subsystems, and/or resource management systems discussed below. However, while a specific LCS provisioning system 700 has been illustrated and described, one of skill in the art in possession of the present disclosure will recognize that the LCS-NVMe/TCP storage target system of the present disclosure may include a variety of components and component configurations while remaining within the scope of the present disclosure as well.

Figure 8:
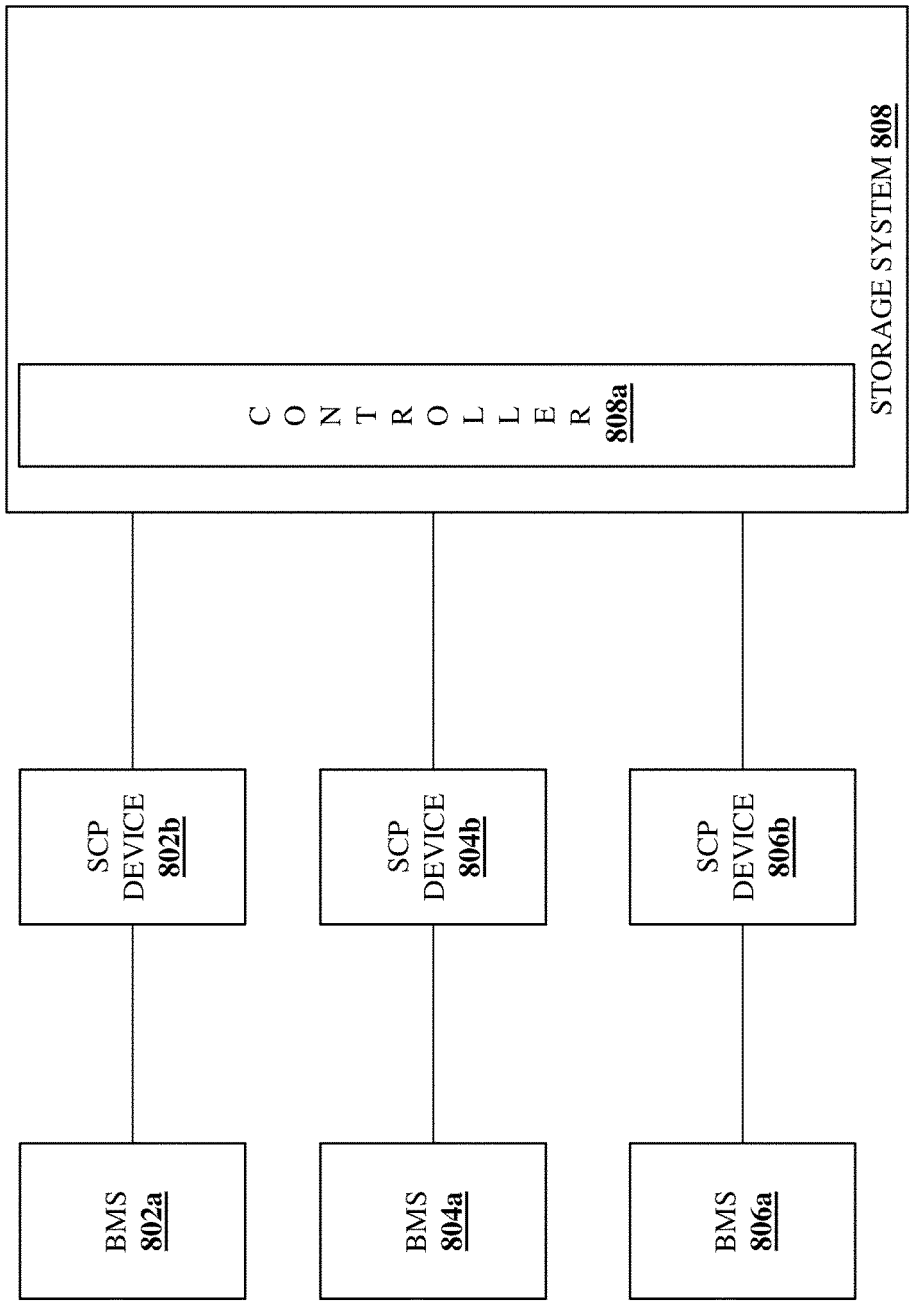
FIG. 8 is a schematic view illustrating an embodiment of an LCS provisioning system that may provide the LCS-NVMe/TCP storage target system of the present disclosure.

Referring now to FIG. 8, an embodiment of an LCS provisioning system 800 is illustrated that may provide the LCS-NVMe/TCP storage target system of the present disclosure, and that one of skill in the art in possession of the present disclosure will appreciate provides a specific example of the LCS provisioning system 700 discussed above with reference to FIG. 7 that is utilized to describe a specific embodiment of the functionality of the LCS-NVMe/TCP storage target system of the present disclosure. In the illustrated embodiment, the LCS provisioning system 800 includes a plurality of host systems that are each provided by a BMS/SCP device combination, with the illustrated embodiment including a first host system provided by a BMS 802*a* that is coupled to an SCP device 802*b*, a second host system provided by a BMS 804*a* that is coupled to an SCP device 804*b*, and a third host system provided by a BMS 806*a* that is coupled to an SCP device 806*b*. Furthermore, as described below, additional host systems may be available to (and used in) the LCS provisioning system 800 while remaining within the scope of the present disclosure. As such, one of skill in the art in possession of the present disclosure will appreciate how the host systems illustrated in FIG. 8 provide specific examples of the host systems 702 and 704 of FIG. 7.

As illustrated, the LCS provisioning system 800 also includes a storage system 808 that includes a storage controller 808*a* and that is coupled to each of the SCP devices 802*b*, 804*b*, and 806*b* in the host systems. Similarly as described above, the storage system 808 may include an NVM storage system such as the eBOF storage system, the POWERFLEX® storage system available from DELL® Inc. of Round Rock, Texas, United States, and/or other NVM storage systems that one of skill in the art in possession of the present disclosure will recognize as capable of providing the NVMe/TCP storage targets discussed below. While not illustrated in FIG. 8, one of skill in the art in possession of the present disclosure will appreciate how a resource management system may be coupled to the storage system 808 and the host systems (e.g., via the SCP devices 802*a*, 804*b*, and 806*b*) similarly as described above, and thus may be provided the resource management system 304 discussed above with reference to FIG. 3 (e.g., an SCPM subsystem as described above).

In an embodiment, that resource management system may include a resource management memory system that includes instruction that, when executed by a resource management processing system in the resource management system, cause the resource management processing system to provide a resource management engine that is configured to perform the functionality of the resource management engines, resource management subsystems, and/or resource management systems discussed below. However, while a specific LCS provisioning system 800 has been illustrated and described, one of skill in the art in possession of the present disclosure will recognize that the LCS-NVMe/TCP storage target system of the present disclosure may include a variety of components and component configurations while remaining within the scope of the present disclosure as well.

Figure 9:
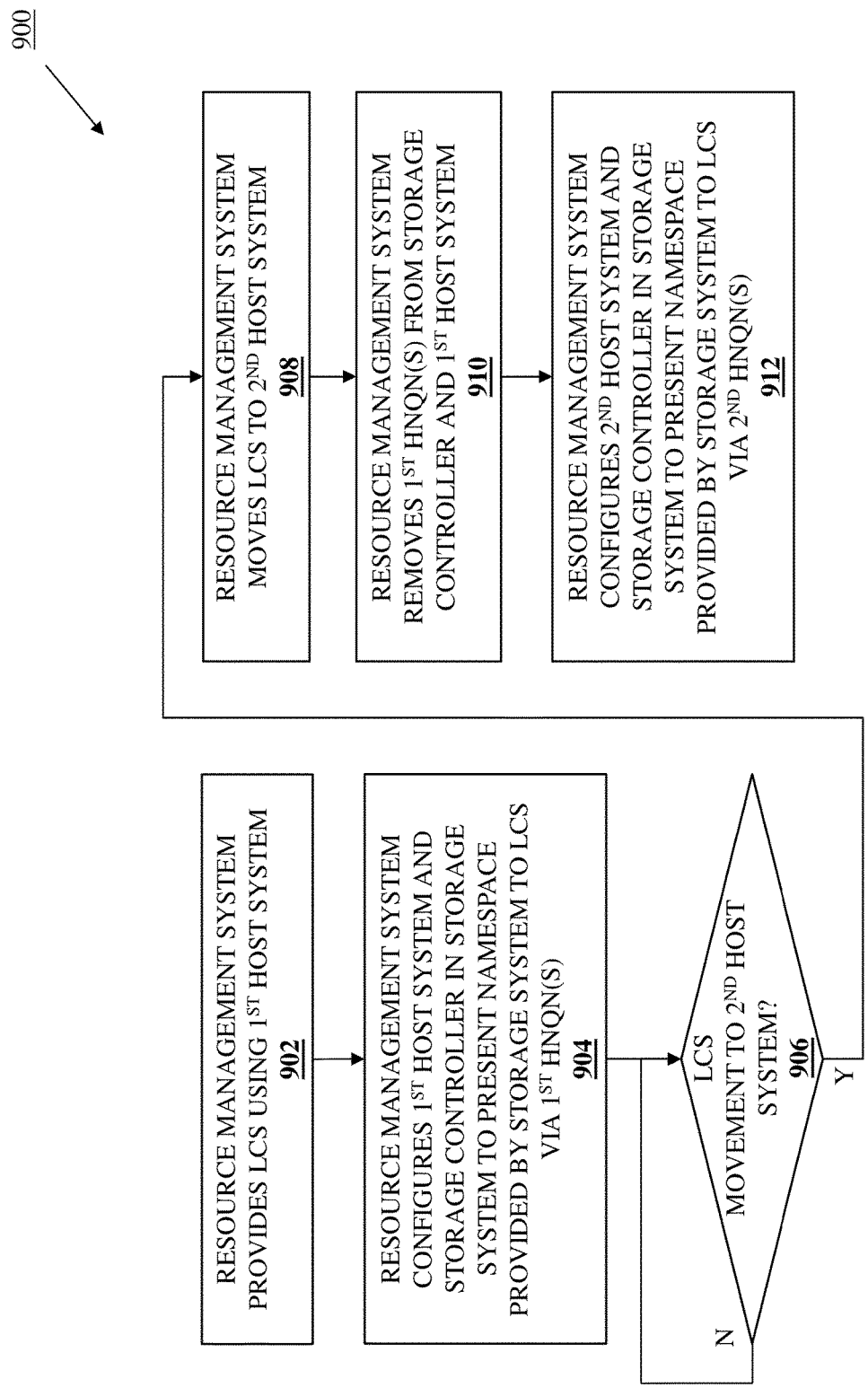
FIG. 9 is a flow chart illustrating an embodiment of a method for providing storage for an LCS using NVMe/TCP storage targets.

Referring now to FIG. 9, an embodiment of a method 900 for providing storage for an LCS using NVMe/TCP storage targets is illustrated. As discussed below, the systems and methods of the present disclosure utilize HNQN "leases" for presenting a namespace in a storage system to an LCS via the provisioning of "new" HNQN(s) each time that LCS is moved to a "new" host system, while removing "old" HNQN(s) from any "old" host system. For example, the LCS-NVMe/TCP storage target system includes a storage system having a storage controller, host systems that are coupled to the storage system, and a resource management system that is coupled to the storage system and the host systems. The resource management system provides a first LCS using a first host system, and configures the first host system and the storage controller to present a first namespace provided by the storage system to the first LCS via first Host NVMe Qualified Name(s) (HNQN(s)). The resource management system then moves the first LCS to a second host system, removes the first HNQN(s) from the storage controller and the first host system, and configures the second host system and the storage controller to present the first namespace provided by the storage system to the first LCS via second HNQN(s). As such, an LCS may move between different host systems while that LCS continues to use the same NVMe/TCP storage target in a storage system.

Figure 10:
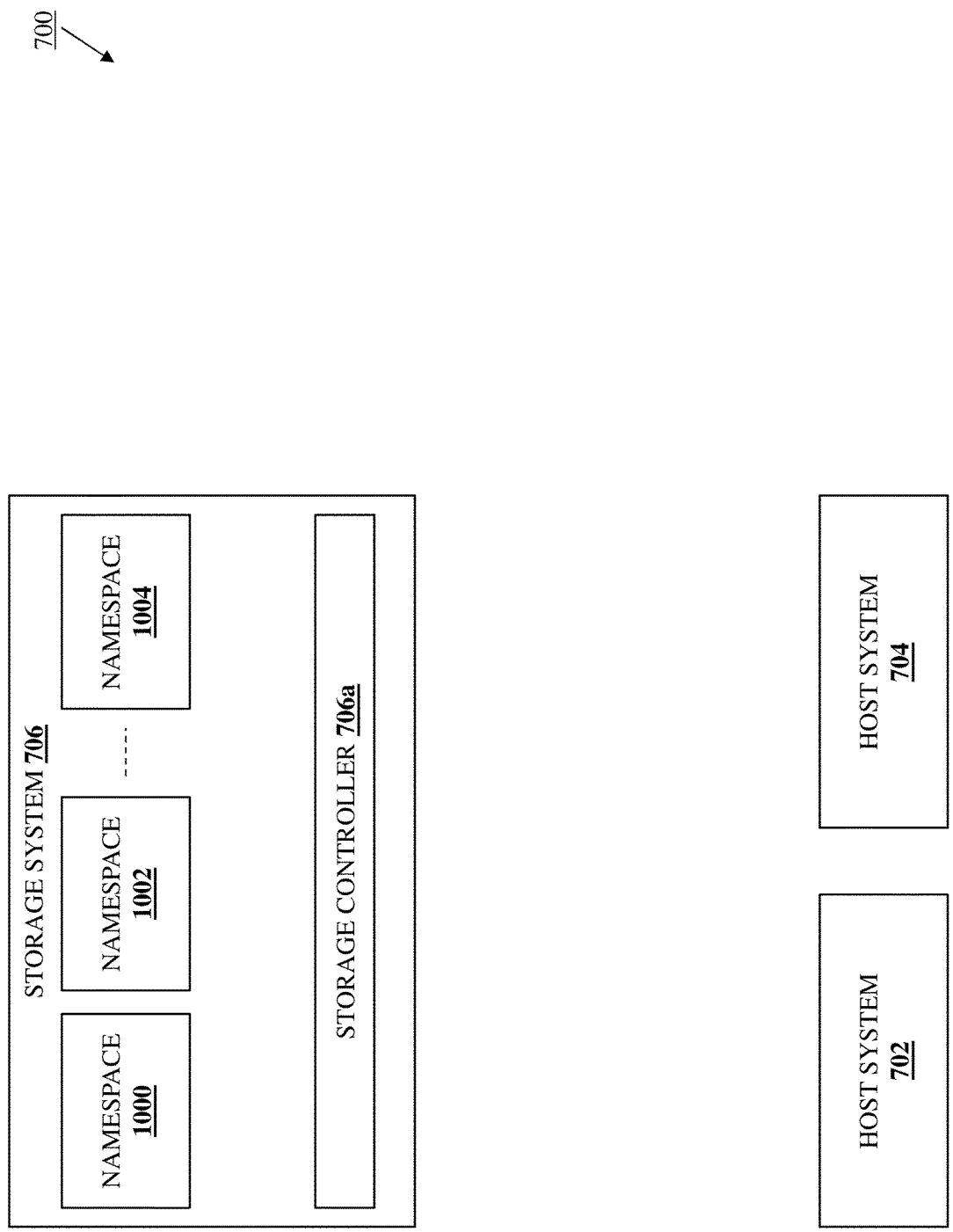
FIG. 10 is a schematic view illustrating an embodiment of the LCS provisioning system of FIG. 7 operating during the method of FIG. 7.

With reference to FIG. 10, during or prior to the method 900, the storage controller 706*a* in the storage system 706 of the LCS provisioning system 700 may create a plurality of namespaces 1000, 1002, and up to 1004. As will be appreciated by one of skill in the art in possession of the present disclosure, each of the namespaces 1000-1004 may provide one of the NVMe/TCP storage targets described herein, and may be created using any of a variety of namespace creation techniques that would be apparent to one of skill in the art in possession of the present disclosure. Similarly, with reference to FIG. 14, during or prior to the method 900, the storage controller 808*a* in the storage system 808 of the LCS provisioning system 800 may create a plurality of namespaces 1400, 1402, 1404, 1406, 1408, 1410, 1412, 1414, and 1416. As will be appreciated by one of skill in the art in possession of the present disclosure, each of the namespaces 1400-1416 may provide one of the NVMe/TCP storage targets described herein, and may be created using any of a variety of namespace creation techniques that would be apparent to one of skill in the art in possession of the present disclosure.

Figure 11A:
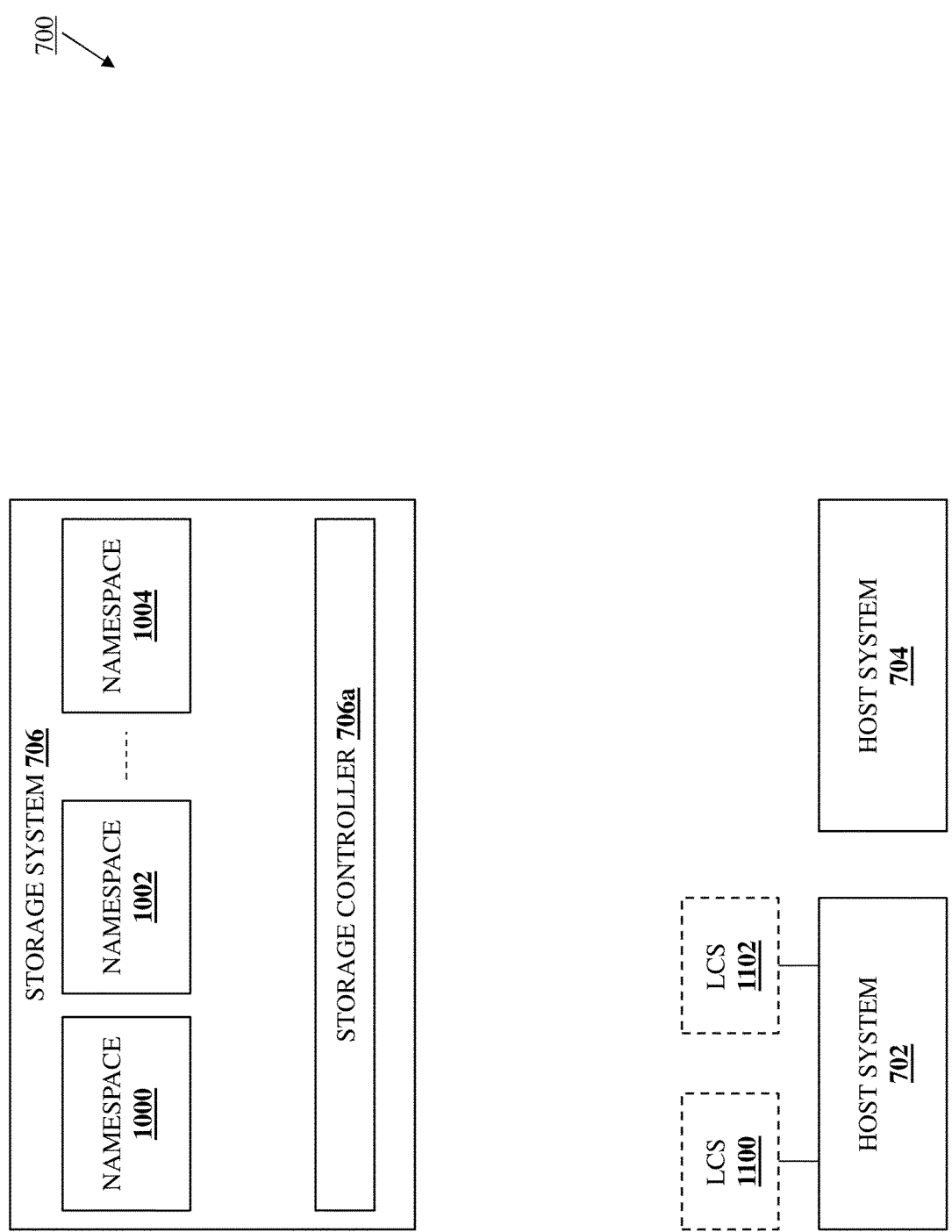
FIG. 11A is a schematic view illustrating an embodiment of the LCS provisioning system of FIG. 7 operating during the method of FIG. 7.

The method 900 begins at block 902 where a resource management system provides an LCS using a first host system. With reference to FIG. 11A, in an embodiment of block 902, the resource management engine in the resource management system may perform LCS provisioning operations that include providing an LCS 1100 and an LCS 1102 using the host system 702, and one of skill in the art in possession of the present disclosure will appreciate how the LCSs 1100 and 1102 may be provided using the host system 702 similarly as described above (e.g., using any resource devices including the host system 702, using CPU device(s) and memory system(s) in a BMS that provides the host system similarly as described above, and/or using any other LCS provisioning operations that would be apparent to one of skill in the art in possession of the present disclosure). Furthermore, while the LCS-NVMe/TCP storage target system of the present disclosure is described herein as being utilized with LCSs, one of skill in the art in possession of the present disclosure will appreciate how the teachings herein may be used to provide a virtual host-NVMe/TCP storage target system that operates similarly as described below with any of a variety of virtual hosts that may be provided in place of the LCSs described below.

Figure 11B:
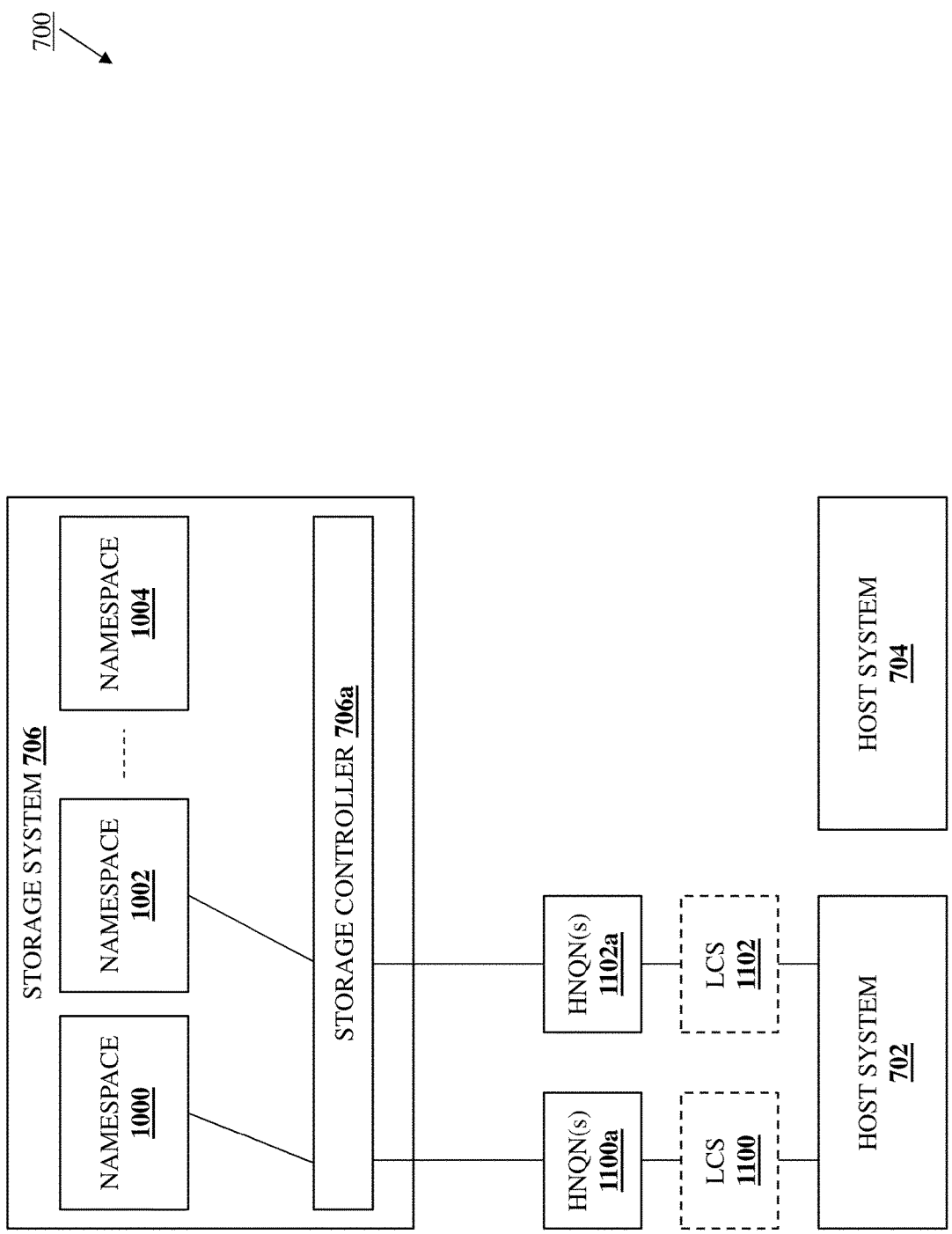
FIG. 11B is a schematic view illustrating an embodiment of the LCS provisioning system of FIG. 7 operating during the method of FIG. 7.

The method 900 then proceeds to block 904 where the resource management system configures the first host system and a storage controller in a storage system to present a namespace provided by the storage system to the LCS via first HNQN(s). With reference to FIG. 11B, in the illustrated embodiment of block 904, the resource management engine in the resource management system may perform HNQN provisioning operations that include generating one or more Host NVMe-Qualified Names (HNQNs) 1100a, and configuring the storage controller 706a and the host system 702 with those HNQN(s) 1100a in order to present the namespace 1000 provided by the storage system 706 to the LCS 1100. While not illustrated in detail with regard to the embodiment illustrated in FIG. 11A, the LCS 1100 may utilize a Globally Unique IDentifier (GUID) that uniquely identifies the namespace 1000 presented to the LCS 1100, with that GUID remaining stable even if the other identifiers provided for that namespace 1000 as described herein are not stable. As such, one of skill in the art in possession of the present disclosure will appreciate how the HNQN(s) 1100a "coupling" the LCS 1100 to the namespace 1000 in FIG. 11B may be stored in and/or otherwise utilized by the storage controller 706a and the host system 702 (e.g., by an SCP device included in or connected to the host system 702) to present the namespace 1000 to the LCS 1100 as described below. Furthermore, one of skill in the art in possession of the present disclosure will appreciate how the LCS 1100 provided on the host system 702 may operate to store data in the storage system 706 using the namespace 1000 during its subsequent operation.

Similarly, in the illustrated embodiment of block 904, the HNQN provisioning operations performed by the resource management engine in the resource management system may include generating one or more Host NVMe-Qualified Names (HNQNs) 1102a, and configuring the storage controller 706a and the host system 702 with those HNQN(s) 1102a in order to present the namespace 1002 provided by the storage system 706 to the LCS 1102. While not illustrated in detail with regard to the embodiment illustrated in FIG. 11A, the LCS 1102 may utilize a Globally Unique IDentifier (GUID) that uniquely identifies the namespace 1002 presented to the LCS 1102 with that GUID remaining stable even if the other identifiers provided for that namespace 1002 as described herein are not stable. As such, one of skill in the art in possession of the present disclosure will appreciate how the HNQN(s) 1102a "coupling" the LCS 1102 to the namespaces 1002 in FIG. 11B may be stored in and/or otherwise utilized by the storage controller 706a and the host system 702 (e.g., by n SCP device included in or connected to the host system 702) to present the namespace 1002 to the LCS 1102 as described below. Furthermore, one of skill in the art in possession of the present disclosure will appreciate how the LCS 1102 may operate to store data in the storage system 706 using the namespace 1002 during its subsequent operation.

As will be appreciated by one of skill in the art in possession of the present disclosure, the embodiment of blocks 902 and 904 of the method 900 provide an example of "on-the-fly" provisioning of HNQNs to LCSs, with the HNQNs used to present namespaces to LCSs generated and provisioned following the provisioning of those LCSs. However, in other embodiments, at least some of the HNQNs used to present namespaces to LCSs may be "pre-provisioned" (e.g., generated and provisioned prior to the provisioning of those LCSs). As such, in some embodiments, at least a portion of block 904 of the method 900 may be performed prior to block 902.

Figure 15:
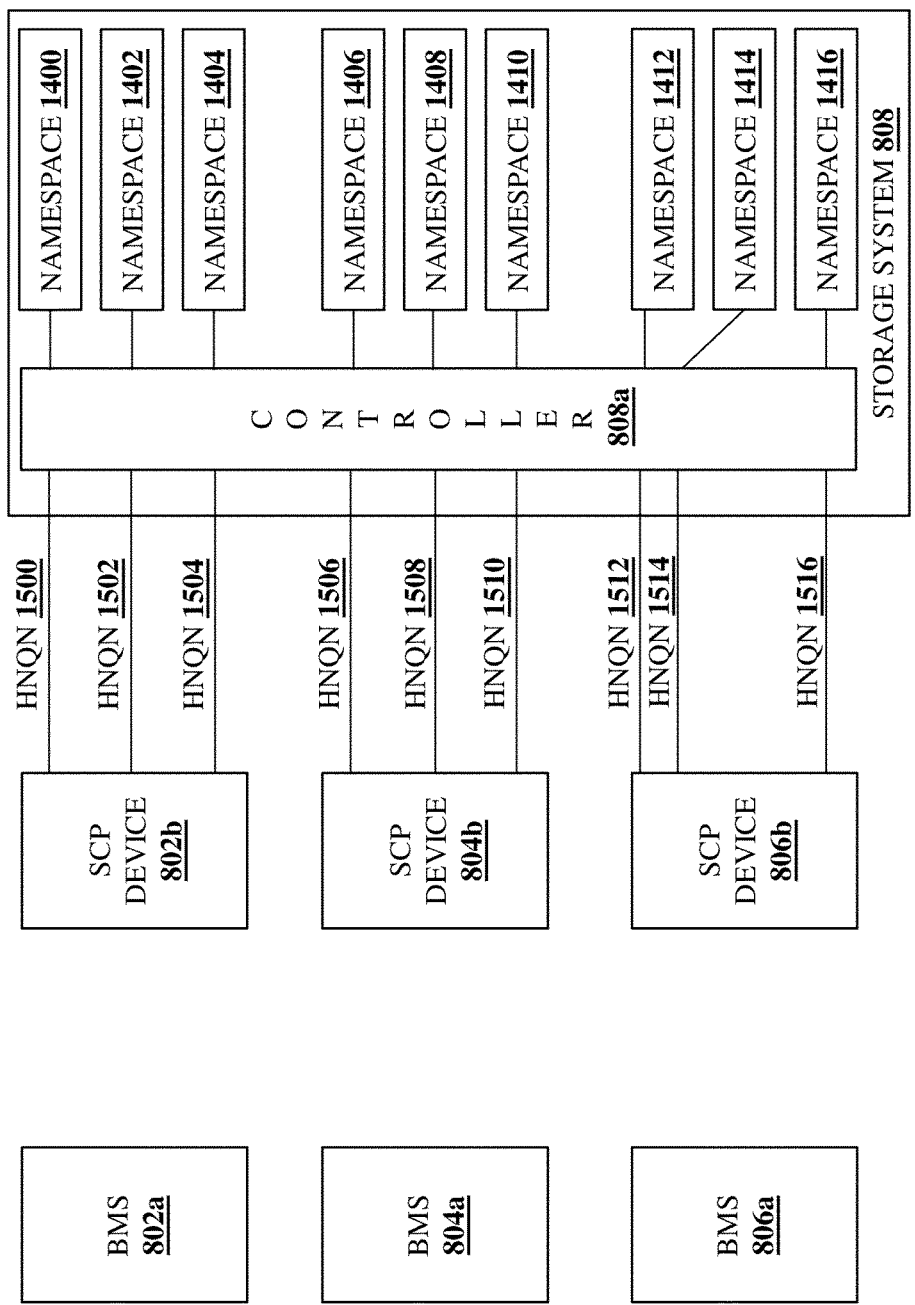
FIG. 15 is a schematic view illustrating an embodiment of the LCS provisioning system of FIG. 8 operating during the method of FIG. 7.

For example, with reference to the embodiment illustrated in FIG. 15, a portion of block 904 of the method 900 may be performed prior to block 902 to "pre-provision" HNQNs as discussed above. In the specific example illustrated in FIG. 15, at block 904 the resource management engine in the resource management system may identify the SCP devices 802b, 804b, and 806b discussed above with reference to FIG. 8 as SCP devices that may be used to provide LCSs connectivity to the storage system 808. In response to identifying the SCP device 802b as described above, the resource management engine may perform HNQN pre-provisioning operations that include generating HNQNs 1500, 1502, and 1504, and configuring the storage controller 808a and the SCP device 802b to present the namespaces 1400, 1402, and 1404, respectively, provided by the storage system 808 to one or more subsequently-provided LCSs using those HNQN(s) at block 904. As such, one of skill in the art in possession of the present disclosure will appreciate how the HNQN(s) 1500, 1502, and 1504 "coupling" the SCP device 802b to the namespaces 1400, 1402, and 1404, respectively, in FIG. 16 may be stored in and/or otherwise utilized by the storage controller 808a and the SCP device 802b to present those namespaces to an LCS as described below.

Similarly, in response to identifying the SCP device 804b as described above, the resource management engine may perform HNQN pre-provisioning operations that include generating HNQNs 1506, 1508, and 1510, and configuring the storage controller 808a and the SCP device 804b to present the namespaces 1406, 1408, and 1410, respectively, provided by the storage system 808 to one or more subsequently-provided LCSs using those HNQN(s) at block 904. As such, one of skill in the art in possession of the present disclosure will appreciate how the HNQN(s) 1506, 1508, and 1510 "coupling" the SCP device 804b to the namespaces 1406, 1408, and 1410, respectively, in FIG. 16 may be stored in and/or otherwise utilized by the storage controller 808a and the SCP device 804b to present those namespaces to an LCS as described below.

Similarly, in response to identifying the SCP device 806b as described above, the resource management engine may perform HNQN pre-provisioning operations that include generating HNQNs 1512, 1514, and 1516, and configuring the storage controller 808a and the SCP device 806b to present the namespaces 1412, 1414, and 1416, respectively, provided by the storage system 808 to one or more subsequently-provided LCSs using those HNQN(s) at block 904. As such, one of skill in the art in possession of the present disclosure will appreciate how the HNQN(s) 1512, 1514, and 1516 "coupling" the SCP device 806b to the namespaces 1414, 1414, and 1416, respectively, in FIG. 16 may be stored in and/or otherwise utilized by the storage controller 808*a* and the SCP device 806*b* to present those namespaces to an LCS as described below.

Figure 16:
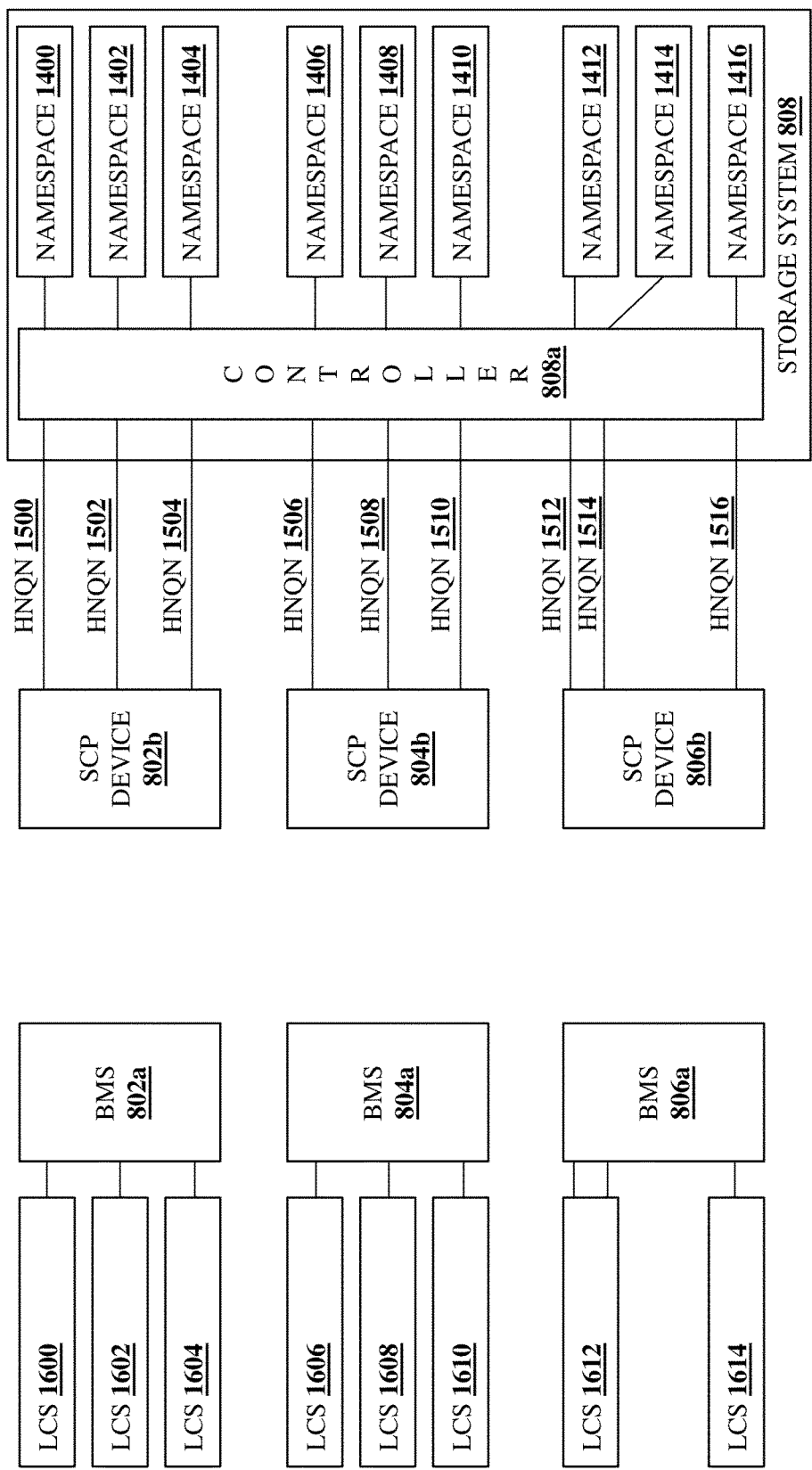
FIG. 16 is a schematic view illustrating an embodiment of the LCS provisioning system of FIG. 8 operating during the method of FIG. 7.

With reference to FIG. 16, following the performance of the portion of block 904 of the method 900 as described above, at block 902 the resource management engine in the resource management system may perform LCS provisioning operations that include providing an LCS 1600, an LCS 1602, and an LCS 1604 using the BMS 802*a*. Similarly, the LCS provisioning operations may include the resource management engine providing an LCS 1606, an LCS 1608, and an LCS 1610 using the BMS 804*a*. Similarly, the LCS provisioning operations may include the resource management engine providing an LCS 1612 and an LCS 1614 using the BMS 806*a*.

One of skill in the art in possession of the present disclosure will appreciate how the LCSs 1600-1614 may be provided using the BMSs 802*a*, 804*a*, and 806*a* similarly as described above (e.g., using CPU device(s) and memory system(s) in the BMSs, using other resource devices and/or resource systems, and/or using any other LCS provisioning operations that would be apparent to one of skill in the art in possession of the present disclosure). Similarly as described above, while the LCS-NVMe/TCP storage target system of the present disclosure is described herein as being utilized with LCSs, one of skill in the art in possession of the present disclosure will appreciate how the teachings herein may be used to provide a virtual host-NVMe/TCP storage target system that operates similarly as described below with any of a variety of virtual hosts that may be provided in place of the LCSs described below.

Figure 17:
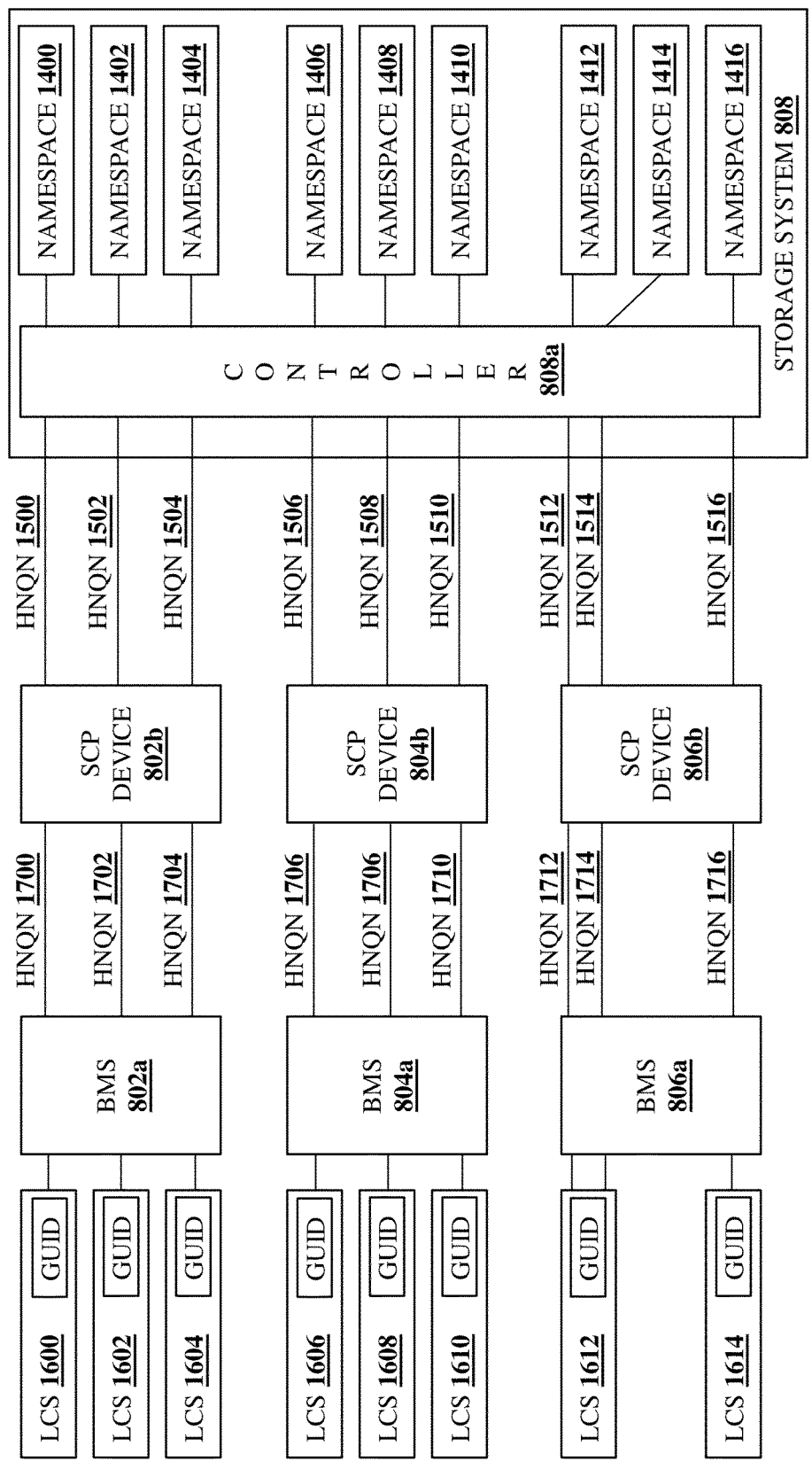
FIG. 17 is a schematic view illustrating an embodiment of the LCS provisioning system of FIG. 8 operating during the method of FIG. 7.

With reference to FIG. 17, following the performance of block 902, the resource management engine in the resource management system may perform the remainder of block 904, which may include HNQN provisioning operations that include generating HNQNs 1700, 1702, and 1704, and configuring the BMS 802*a* and the SCP device 802*b* to present the namespaces 1400, 1402, and 1404, respectively, provided by the storage system 808 to the LCSs 1600, 1602, and 1604, respectively, using those HNQNs 1700, 1702, and 1704, respectively (i.e., along with the HNQNs 1500, 1502, and 1504, respectively, utilized by the SCP device 802*b* and the storage controller 808*a* as discussed above). Similarly as described above, and as illustrated in FIG. 17, each of the LCSs 1600, 1602, and 1604 may utilize a respective Globally Unique IDentifier (GUID) that uniquely identifies the namespace 1400, 1402, and 1404, respectively, presented to that LCS, with that GUID remaining stable even if the other identifiers provided for that namespace as described herein are not stable. As such, one of skill in the art in possession of the present disclosure will appreciate how the HNQNs 1700, 1702, and 1704 "coupling" the SCP device 802*b* to the BMS 802*a*, respectively, in FIG. 17 may be stored in and/or otherwise utilized by the BMS 802*a* and the SCP device 802*b* to present the namespaces 1400, 1402, and 1404, respectively, to the LCSs 1600, 1602, and 1604, respectively.

Similarly, the HNQN provisioning operations performed by the resource management engine may include generating HNQNs 1706, 1708, and 1710, and configuring the BMS 804*a* and the SCP device 804*b* to present the namespaces 1406, 1408, and 1410, respectively, provided by the storage system 808 to the LCSs 1606, 1608, and 1610, respectively, using those HNQNs 1706, 1708, and 1710, respectively (i.e., along with the HNQNs 1506, 1508, and 1510, respectively, utilized by the SCP device 804*b* and the storage controller 808*a* as discussed above). Similarly as described above, and as illustrated in FIG. 17, each of the LCSs 1606, 1608, and 1610 may utilize a respective Globally Unique IDentifier (GUID) that uniquely identifies the namespaces 1406, 1408, and 1410, respectively, presented to that LCS, with that GUID remaining stable even if the other identifiers provided for that namespace as described herein are not stable. As such, one of skill in the art in possession of the present disclosure will appreciate how the HNQNs 1706, 1708, and 1710 coupling the SCP device 804*b* to the BMS 804*a*, respectively, in FIG. 17 may be stored in and/or otherwise utilized by the BMS 804*a* and the SCP device 804*b* to present the namespaces 1406, 1408, and 1410, respectively, to the LCSs 1606, 1608, and 1610, respectively.

Similarly, the HNQN provisioning operations performed by the resource management engine may include generating HNQNs 1712 and 1714, and configuring the BMS 806*a* and the SCP device 806*b* to present the namespaces 1412 and 1414 provided by the storage system 808 to the LCS 1612 using those HNQNs 1712 and 1714 (i.e., along with the HNQNs 1512 and 1514 utilized by the SCP device 806*b* and the storage controller 808*a* as discussed above); and generating HNQN 1716, and configuring the BMS 806*a* and the SCP device 806*b* to present the namespace 1416 provided by the storage system 808 to the LCS 1614 using that HNQN 1716 (i.e., along with the HNQN 1516 utilized by the SCP device 808*b* and the storage controller 808*a* as discussed above). Similarly as described above, and as illustrated in FIG. 17, the LCSs 1612 and 1614 may utilize a respective Globally Unique IDentifier (GUID) that uniquely identifies the namespaces 1412/1414 and 1416, respectively, presented to that LCS, with that GUID remaining stable even if the other identifiers provided for the namespace(s) as described herein are not stable. As such, one of skill in the art in possession of the present disclosure will appreciate how the HNQNs 1712 and 1714 coupling the SCP device 806*b* to the BMS 806*a* in FIG. 17 may be stored in and/or otherwise utilized by the BMS 806*a* and the SCP device 806*b* to present the namespaces 1412 and 1414 to the LCS 1612, and how the HNQN 1716 coupling the SCP device 806*b* to the BMS 806*a* in FIG. 17 may be stored in and/or otherwise utilized by the BMS 806*a* and the SCP device 806*b* to present the namespace 1416 to the LCS 1614.

However, while the specific example in FIG. 17 illustrates the presentment of a single namespace to respective LCSs (e.g., each of the namespaces 1400, 1402, 1404, 1406, 1408, 1410, and 1416 to the respective LCSs 1600, 1602, 1604, 1606, 1608, 1610, and 1614), as well as the presentment of a pair of namespaces to a single LCS (e.g., the namespaces 1412 and 1414 to the LCS 1612), one of skill in the art in possession of the present disclosure will appreciate how different namespace/LCS presentations (e.g., presenting a single namespace to multiple LCSs) will fall within the scope of the present disclosure as well.

As will be appreciated by one of skill in the art in possession of the present disclosure, the configuration of any host systems (e.g., any BMS/SCP device combination) and the storage controller to present namespace(s) to an LCS as described above may establish an NVMe/TCP session between the virtual host provided by that LCS and the NVMe/TCP storage target provided by that namespace. Furthermore, any NVMe/TCP session established as described above may be configured to provide a Quality of Service (QOS) with regard to the utilization of the storage system by the LCS, with the storage resources in the storage system that provide the namespace(s) used by that LCS selected and configured to satisfy that QoS, and the HNQNs provided to present those namespace(s) to that LCS configured to satisfy that QoS as well. As such, block 904 of the method 900 may include configuring any HNQN(s) that have been provided to present namespace(s) to an LCS to provide that a QoS required by the LCS.

As such, with reference back to FIG. 11B, the HNQN(s) 1100*a* may be configured to provide a QoS required by the LCS 1100, which one of skill in the art in possession of the present disclosure will appreciate may configure those HNQN(s) 1100*a* to cause the host system 702 to provide processing resources, memory resources, networking resources, and/or other resources in the host system 702 that will satisfy the QoS required by the LCS 1100, and may configure those HNQN(s) 1100*a* to cause the storage controller 706*a* to provide processing resources, memory resources, networking resources, storage resources, and/or other resources in the storage system 706 that will satisfy the QoS required by the LCS 1100. Similarly, the HNQN(s) 1102*a* may be configured to provide a QoS required by the LCS 1102, which one of skill in the art in possession of the present disclosure will appreciate may configure those HNQN(s) 1102*a* to cause the host system 702 to provide processing resources, memory resources, networking resources, and/or other resources in the host system 702 that will satisfy the QoS required by the LCS 1102, and may configure those HNQN(s) 1102*a* to cause the storage controller 706*a* to provide processing resources, memory resources, networking resources, storage resources, and/or other resources in the storage system 706 that will satisfy the QoS required by the LCS 1102.

With reference back to FIG. 17, the HNQN 1500 may be configured to provide a QoS required by the LCS 1600, which one of skill in the art in possession of the present disclosure will appreciate may configure the HNQN 1500 to cause the BMS 802*a* to provide processing resources, memory resources, and/or other resources in the BMS 802*a* that will satisfy the QoS required by the LCS 1600, and cause the SCP device 802*b* to provide processing resources, memory resources, networking resources, and/or other resources in the SCP device 802*b* that will satisfy the QoS required by the LCS 1600. Similarly, the HNQN 1700 may be configured to provide a QoS required by the LCS 1600, which one of skill in the art in possession of the present disclosure will appreciate may configure the HNQN 1700 to cause the SCP device 802*b* to provide processing resources, memory resources, networking resources, and/or other resources in the SCP device 802*b* that will satisfy the QoS required by the LCS 1600, and cause the cause the storage controller 808*a* to provide processing resources, memory resources, networking resources, storage resources, and/or other resources in the storage system 808 that will satisfy the QoS required by the LCS 1600.

While not described in detail, one of skill in the art in possession of the present disclosure will appreciate how the HNQNs 1502 and 1702 may be configured to provide a QoS required by the LCS 1602, the HNQNs 1504 and 1704 may be configured to provide a QoS required by the LCS 1604, the HNQNs 1506 and 1706 may be configured to provide a QoS required by the LCS 1606, the HNQNs 1508 and 1708 may be configured to provide a QoS required by the LCS 1608, the HNQNs 1510 and 1710 may be configured to provide a QoS required by the LCS 1610, and the HNQNs 1516 and 1716 may be configured to provide a QoS required by the LCS 1614, similarly as described above for the HNQNs 1500 and 1700/LCS 1600 discussed above.

Furthermore, the HNQNs 1512 and 1712, and the HNQNs 1514 and 1714, may each be configured to provide a respective QoSs required by the LCS 1612 similarly as described above for the HNQNs 1500 and 1700/LCS 1600 discussed above. As will be appreciated by one of skill in the art in possession of the present disclosure, QoS may be provided per namespace, and thus the QoS provided for the LCS 1612 and namespace 1412 by the HNQNs 1512 and 1712 may be different than the QoS provided for the LCS 1612 and 1414 by the HNQNs 1514 and 1714.

The method 900 then proceeds to decision block 906 where the method 900 proceeds depending on whether the LCS requires movement to a second host system. As discussed above, and as will be appreciated by one of skill in the art in possession of the present disclosure, any LCS provided at block 902 may require movement to a different host system (or BMS/SCP combination) due to, for example, unavailability of their current host system (or current BMS/SCP combination), inability of their current host system (or current BMS/SCP combination) to satisfy their required QoS, and/or due to any of a variety of other LCS/host system movement scenarios that would be apparent to one of skill in the art in possession of the present disclosure. As such, at decision block 906, the method 900 may proceed depending on whether the LCS provided at block 902 requires movement to a different host system. If, at decision block 906, the LCS does not require movement to the second host system, the method 900 returns to decision block 906. As such, the method 900 may loop such that any LCS provided on a host system at block 902 and presented namespace(s) at block 904 will continue to use those namespace(s) to store data as long as that LCS does not require movement to a different host system.

Figure 12A:
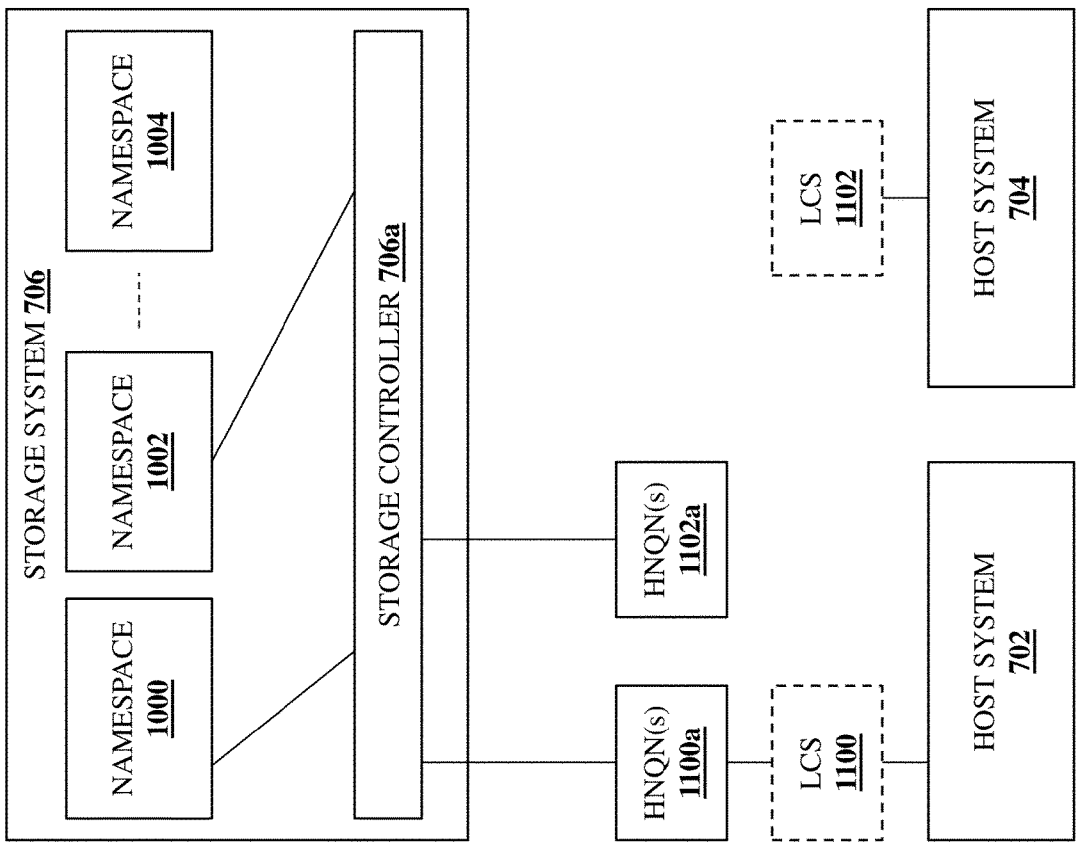
FIG. 12A is a schematic view illustrating an embodiment of the LCS provisioning system of FIG. 7 operating during the method of FIG. 7.

If, at decision block 906, the LCS requires movement to the second host system, the method 900 proceeds to block 908 where the resource management system moves the LCS to the second host system. With reference to FIG. 12A, at block 908 in a first embodiment of the method 900 and in response to determining that the LCS 1102 requires movement to the host system 704, the resource management engine in the resource management system may perform LCS movement operations that include removing the LCS 1102 from the host system 702 and providing the LCS 1102 using the host system 704, and one of skill in the art in possession of the present disclosure will appreciate how the LCS 1102 may be removed from the host system 702 and provided using the host system 704 similarly as described above (e.g., using any resource devices including the host system 704, using CPU device(s) and memory system(s) in a BMS that provides the host system similarly as described above, and/or using any other LCS provisioning operations that would be apparent to one of skill in the art in possession of the present disclosure).

Figure 12B:
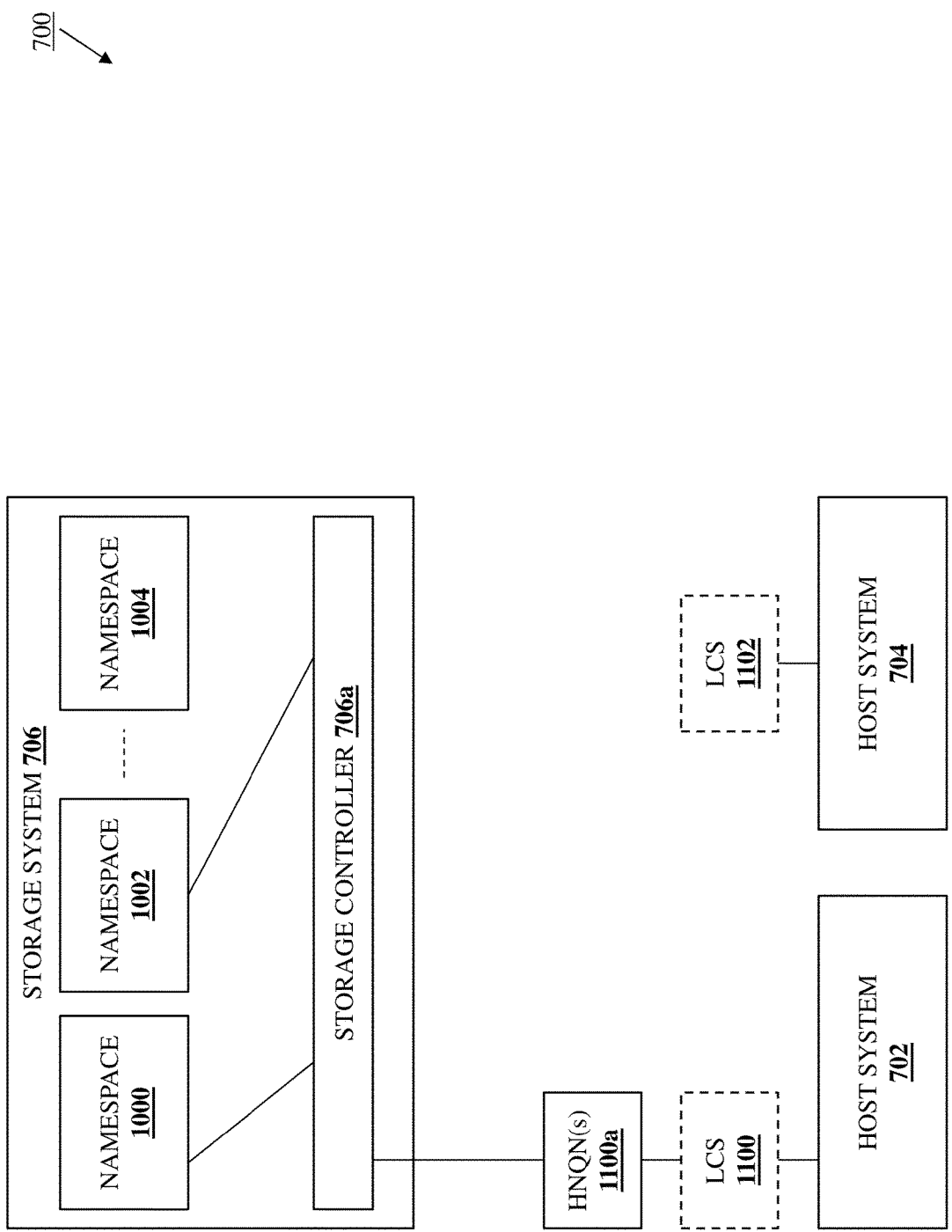
FIG. 12B is a schematic view illustrating an embodiment of the LCS provisioning system of FIG. 7 operating during the method of FIG. 7.

The method 900 then proceeds to block 910 where the resource management system removes the first HNQN(s) from the storage controller and the first host system. With reference to FIG. 12B, at block 910 in this first embodiment of the method 900, the resource management engine in the resource management system may perform HNQN removal operations that include erasing, deleting, and/or otherwise removing the HNQN(s) 1102*a* from the storage controller 706*a* and the host system 702 that were used to present the namespace 1002 provided by the storage system 706 to the LCS 1102, which one of skill in the art in possession of the present disclosure will appreciate will subsequently prevent the storage controller 706*a* from accessing the LCS 1102 via the HNQN(s) 1102*a*.

Figure 12C:
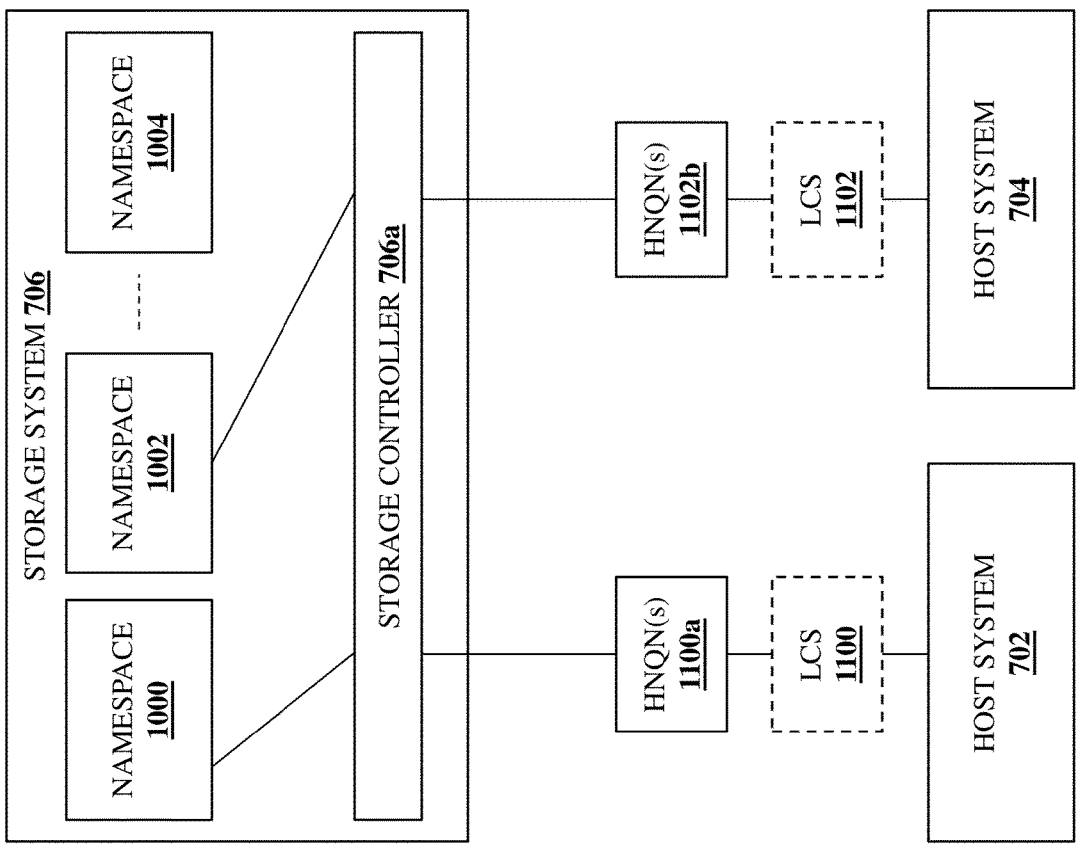
FIG. 12C is a schematic view illustrating an embodiment of the LCS provisioning system of FIG. 7 operating during the method of FIG. 7.

The method 900 then proceeds to block 912 where the resource management system configures the second host system and the storage controller in the storage system to present the namespace provided by the storage system to the LCS via second HNQN(s). With reference to FIG. 12C, at block 912 in this first embodiment of the method 900, the resource management engine in the resource management system may perform HNQN provisioning operations that include generating one or more HNQNs 1102b, and configuring the storage controller 706a and the host system 704 with those HNQN(s) 1102b in order to present the namespace 1002 provided by the storage system 706 to the LCS 1102. As discussed above, while not illustrated in detail with regard to the embodiment illustrated in FIG. 12C, the LCS 1102 may utilize a Globally Unique IDentifier (GUID) that uniquely identifies the namespace 1002 presented to the LCS 1102, with that GUID remaining stable even if the other identifiers provided for that namespace 1002 as described herein are not stable. As such, one of skill in the art in possession of the present disclosure will appreciate how the HNQN(s) 1102b "coupling" the LCS 1102 to the namespace 1002 in FIG. 12C may be stored in and/or otherwise utilized by the storage controller 706a and the host system 704 (e.g., an SCP device included in or connected to the host system 704) to present the namespace 1002 to the LCS 1102 as described below. Furthermore, one of skill in the art in possession of the present disclosure will appreciate how the LCS 1102 provided on the host system 704 may operate to store data in the storage system 706 using the namespace 1002 during its subsequent operation.

Similarly as described above, the HNQN(s) 1102b may be configured to provide a QoS required by the LCS 1102 (e.g., the same QoS configured for the HNQN(s) 1102a as described above, a different QoS than was configured for the HNQN(s) 1102a as described above (e.g., when requirements of the LCS 1102 have changed), etc.), which one of skill in the art in possession of the present disclosure will appreciate may configure those HNQN(s) 1102b to cause the host system 704 to provide processing resources, memory resources, networking resources, and/or other resources in the host system 704 that will satisfy the QoS required by the LCS 1102, and may configure those HNQN(s) 1102b to cause the storage controller 706a to provide processing resources, memory resources, networking resources, storage resources, and/or other resources in the storage system 706 that will satisfy the QoS required by the LCS 1102.

Figure 13A:
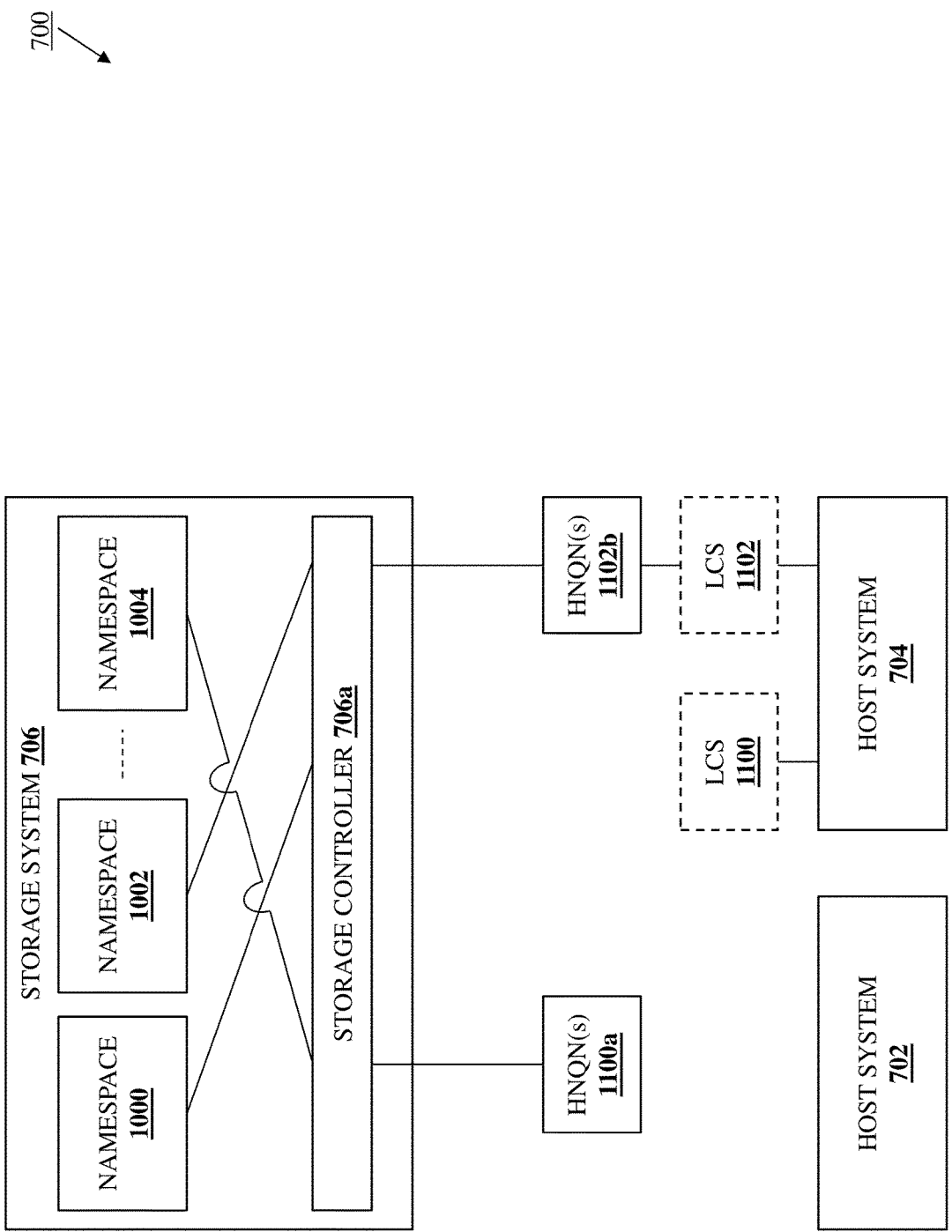
FIG. 13A is a schematic view illustrating an embodiment of the LCS provisioning system of FIG. 7 operating during the method of FIG. 7.

With reference to FIG. 13A, at block 908 in a second embodiment of the method 900 and in response to determining that the LCS 1100 requires movement to the host system 704, the resource management engine in the resource management system may perform LCS movement operations that include removing the LCS 1100 from the host system 702 and providing the LCS 1100 using the host system 704, and one of skill in the art in possession of the present disclosure will appreciate how the LCS 1100 may be removed from the host system 702 and provided using the host system 704 similarly as described above (e.g., using any resource devices including the host system 704, using CPU device(s) and memory system(s) in a BMS that provides the host system similarly as described above, and/or using any other LCS provisioning operations that would be apparent to one of skill in the art in possession of the present disclosure).

Figure 13B:
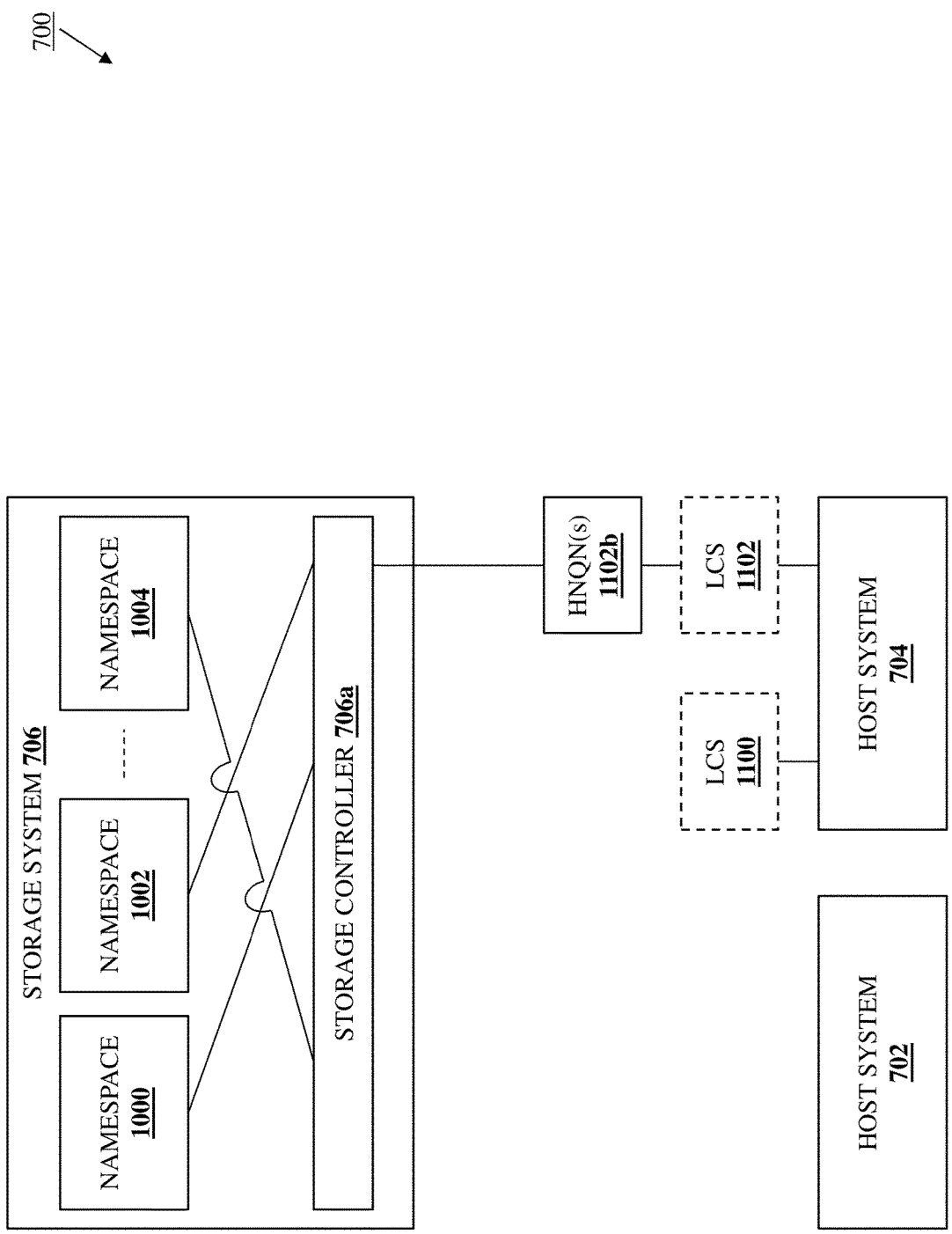
FIG. 13B is a schematic view illustrating an embodiment of the LCS provisioning system of FIG. 7 operating during the method of FIG. 7.

The method 900 then proceeds to block 910 where the resource management system removes the first HNQN(s) from the storage controller and the first host system. With reference to FIG. 13B, at block 910 in this second embodiment of the method 900, the resource management engine in the resource management system may perform HNQN removal operations that include erasing, deleting, and/or otherwise removing the HNQN(s) 1100a from the storage controller 706a and the host system 702 that were used to present the namespace 1000 provided by the storage system 706 to the LCS 1100, which one of skill in the art in possession of the present disclosure will subsequently prevent the storage controller 706a from accessing the LCS 1100 via the HNQN(s) 1100a.

Figure 13C:
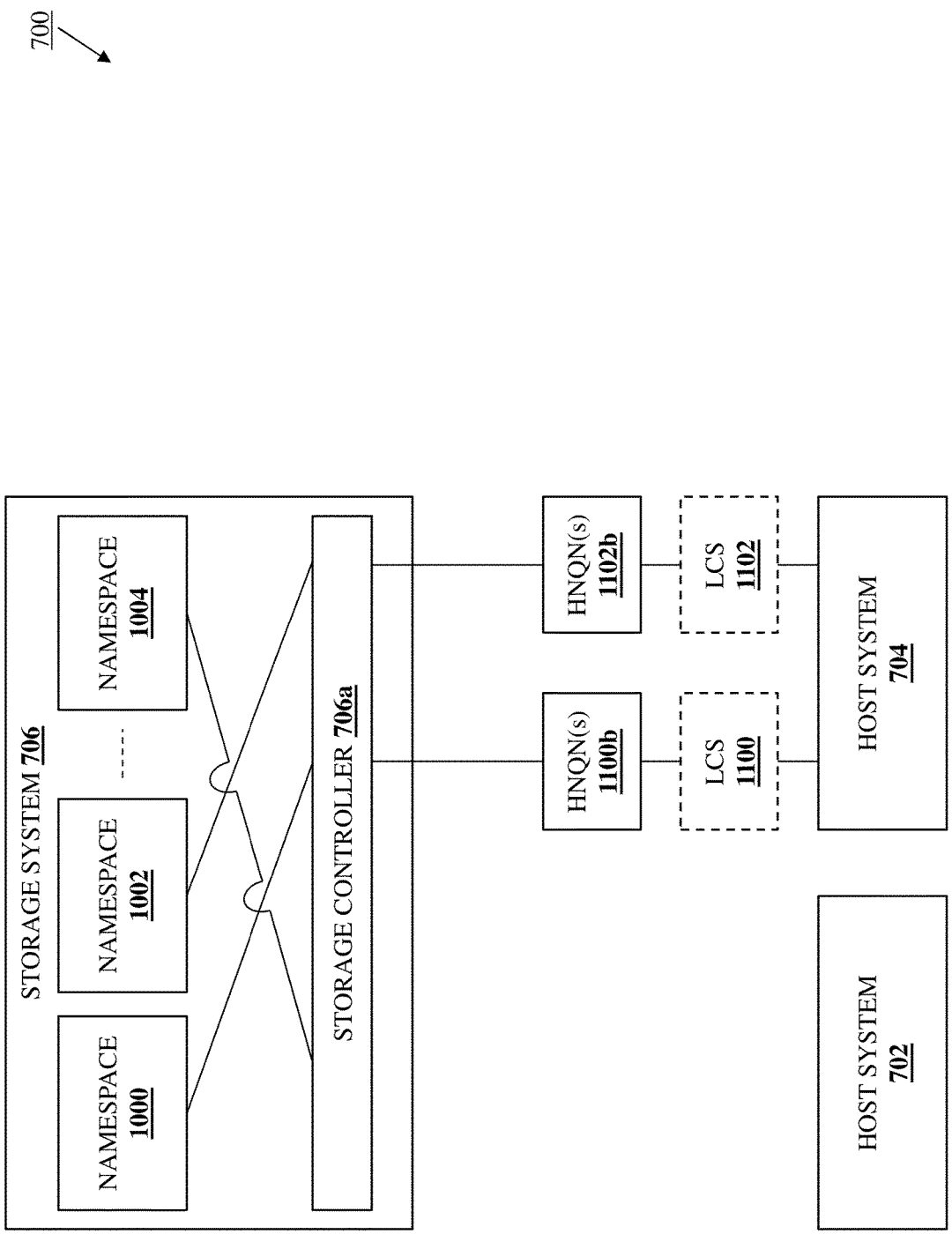
FIG. 13C is a schematic view illustrating an embodiment of the LCS provisioning system of FIG. 7 operating during the method of FIG. 7.

The method 900 then proceeds to block 912 where the resource management system configures the second host system and the storage controller in the storage system to present the namespace provided by the storage system to the LCS via second HNQN(s). With reference to FIG. 13C, at block 912 in this second embodiment of the method 900, the resource management engine in the resource management system may perform HNQN provisioning operations that include generating one or more HNQNs 1100b, and configuring the storage controller 706a and the host system 704 with those HNQN(s) 1100b in order to present the namespace 1000 provided by the storage system 706 to the LCS 1100. As described above, while not illustrated in detail with regard to the embodiment illustrated in FIG. 13C, the LCS 1100 may utilize a Globally Unique IDentifier (GUID) that uniquely identifies the namespace 1000 presented to the LCS 1100, with that GUID remaining stable even if the other identifiers provided for that namespace 1000 as described herein are not stable). As such, one of skill in the art in possession of the present disclosure will appreciate how the HNQN(s) 1100b coupling the LCS 1100 to the namespace 1000 in FIG. 13C may be stored in and/or otherwise utilized by the storage controller 706a and the host system 704 (e.g., an SCP device included in or connected to the host system 704) to present the namespace 1000 to the LCS 1100 as described below. One of skill in the art in possession of the present disclosure will appreciate how the LCS 1100 provided on the host system 704 may operate to store data in the storage system 706 using the namespace 1000 during its subsequent operation.

Similarly as described above, the HNQN(s) 1100b may be configured to provide a QoS required by the LCS 1100 (e.g., the same QoS configured for the HNQN(s) 1100a as described above, a different QoS than was configured for the HNQN(s) 1100a as described above (e.g., when requirements of the LCS 1100 have changed), etc.), which one of skill in the art in possession of the present disclosure will appreciate may configure those HNQN(s) 1100b to cause the host system 704 to provide processing resources, memory resources, networking resources, and/or other resources in the host system 704 that will satisfy the QoS required by the LCS 1100, and may configure those HNQN(s) 1100b to cause the storage controller 706a to provide processing resources, memory resources, networking resources, storage resources, and/or other resources in the storage system 706 that will satisfy the QoS required by the LCS 1100.

Figure 13D:
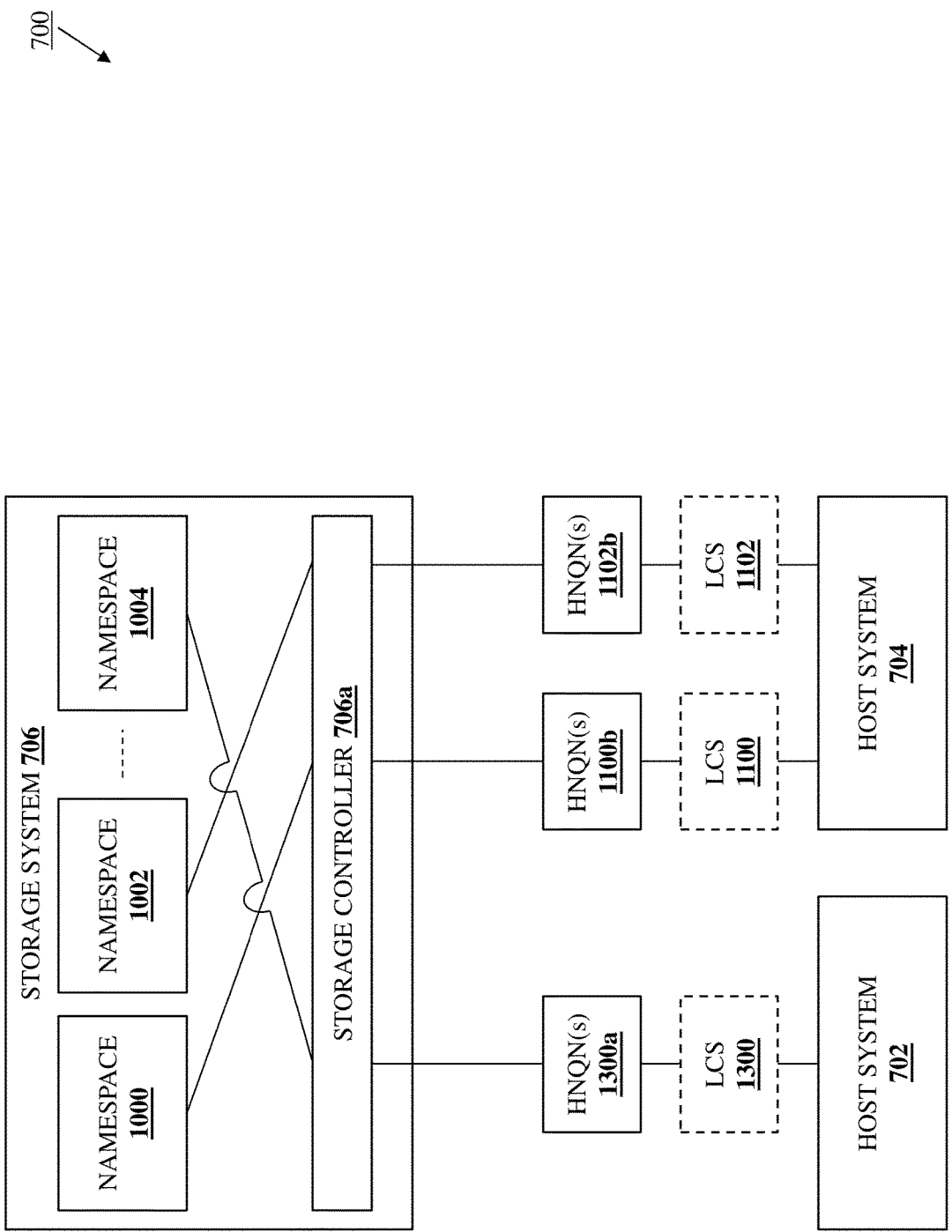
FIG. 13D is a schematic view illustrating an embodiment of the LCS provisioning system of FIG. 7 operating during the method of FIG. 7.

Furthermore, FIG. 13D also illustrates how blocks 902 and 904 of the method 900 may be performed similarly as described above to provide an LCS 1300 using the host system 702, and configuring the host system 702 and the storage controller 706a in the storage system 706 to present the namespace 1004 provided by the storage system 706 to the LCS 1300 via HNQN(s) 1300a. Similarly as discussed above, while not illustrated in detail with regard to the embodiment illustrated in FIG. 13D, the LCS 1300 may utilize a Globally Unique IDentifier (GUID) that uniquely identifies the namespace 1004 presented to the LCS 1300, with that GUID remaining stable even if the other identifiers provided for that namespace 1004 as described herein are not stable.

Figure 18:
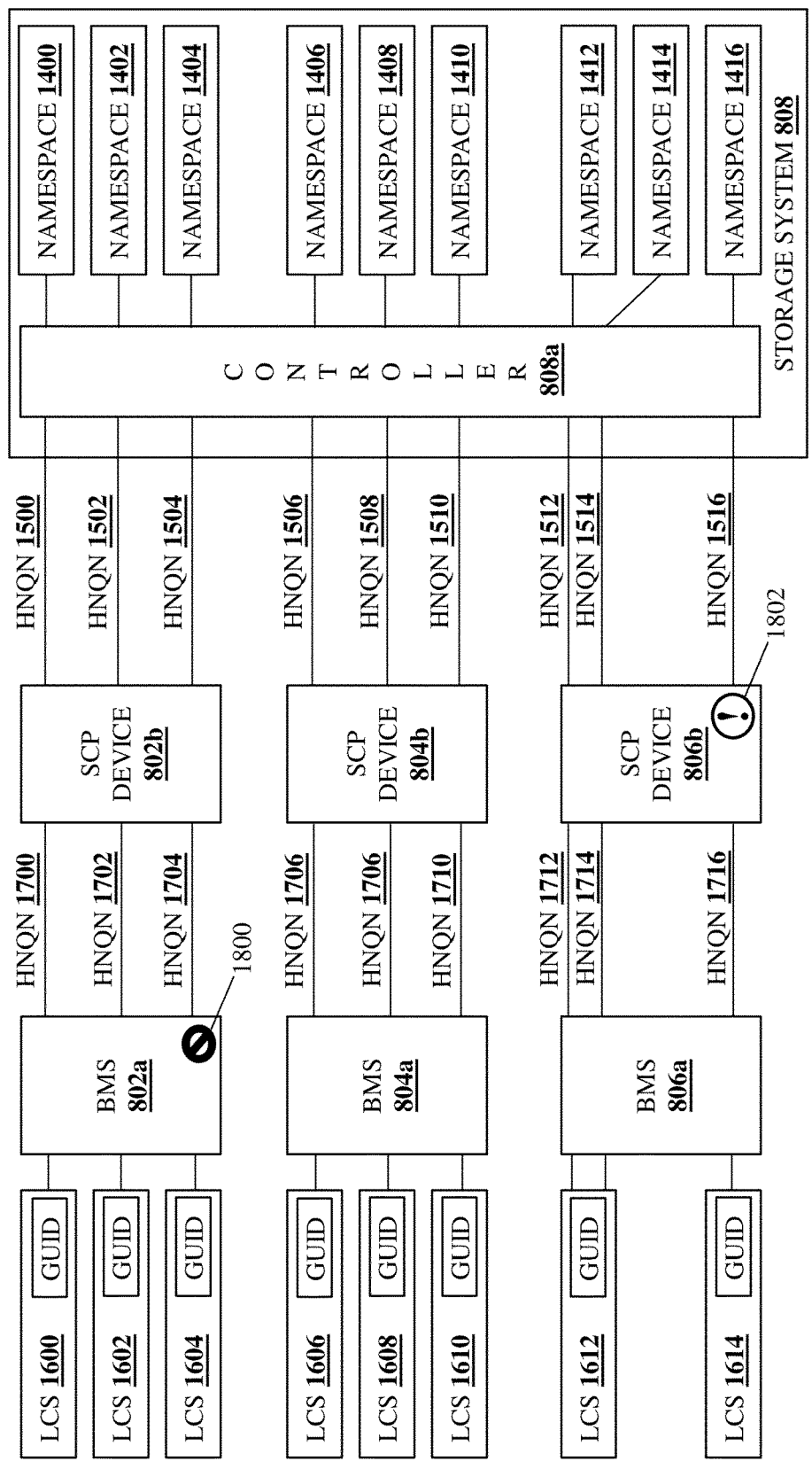
FIG. 18 is a schematic view illustrating an embodiment of the LCS provisioning system of FIG. 8 operating during the method of FIG. 7.

With reference to FIG. 18, in a third embodiment of the method 900, at decision block 906 the resource management engine in the resource management system may determine that each of the LCSs 1600, 1602, and 1604 require movement to a new host system (e.g., a new BMS) due to an unavailability of their current host system (e.g., the BMS 802a). In the specific example provided in FIG. 18, the unavailability of the BMS 802a is indicated by element 1800 on the BMS 802a, which may have been detected by the SCP device 802b and reported to the resource management engine at decision block 906. However, one of skill in the art in possession of the present disclosure will appreciate how the unavailability of the host system for the LCSs 1600, 1602, and 1604 may occur due to the unavailability of the SCP device 802b and/or other host subsystems while remaining within the scope of the present disclosure as well.

Furthermore, in this third embodiment of the method 900, at decision block 906 the resource management engine in the resource management system may determine that the LCS 1614 requires movement to a new host system (e.g., a new BMS) from its current host system (e.g., the BMS 806a) due to the LCS 1612 operating as a "noisy neighbor" by reducing the resources available to the LCS 1614 or otherwise effecting the operation of the LCS 1614. In the specific example provided in FIG. 18, the "noisy neighbor" issues in the BMS 802a are indicated by element 1802 on the SCP device 806b, which may have detected those "noisy neighbor" issues and reported them to the resource management engine at decision block 906. However, while two specific examples for movement of LCSs to new host systems are provided, one of skill in the art in possession of the present disclosure will appreciate how LCS may be moved to new host systems for a variety of reasons (e.g., due to increased performance requirements for the LCS, etc.) while remaining within the scope of the present disclosure as well.

Figure 19A:
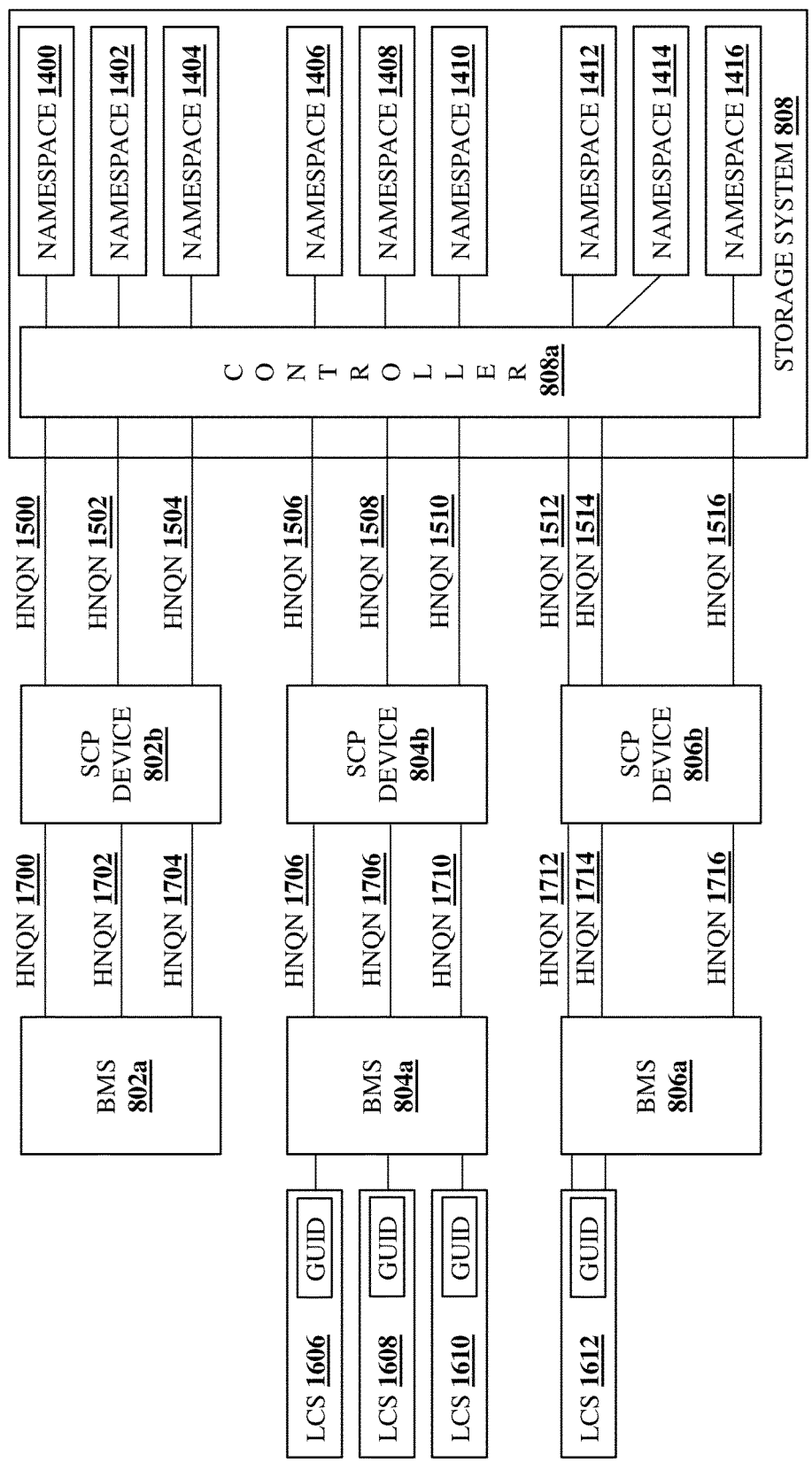
FIG. 19A is a schematic view illustrating an embodiment of the LCS provisioning system of FIG. 8 operating during the method of FIG. 7.
Figure 19B:
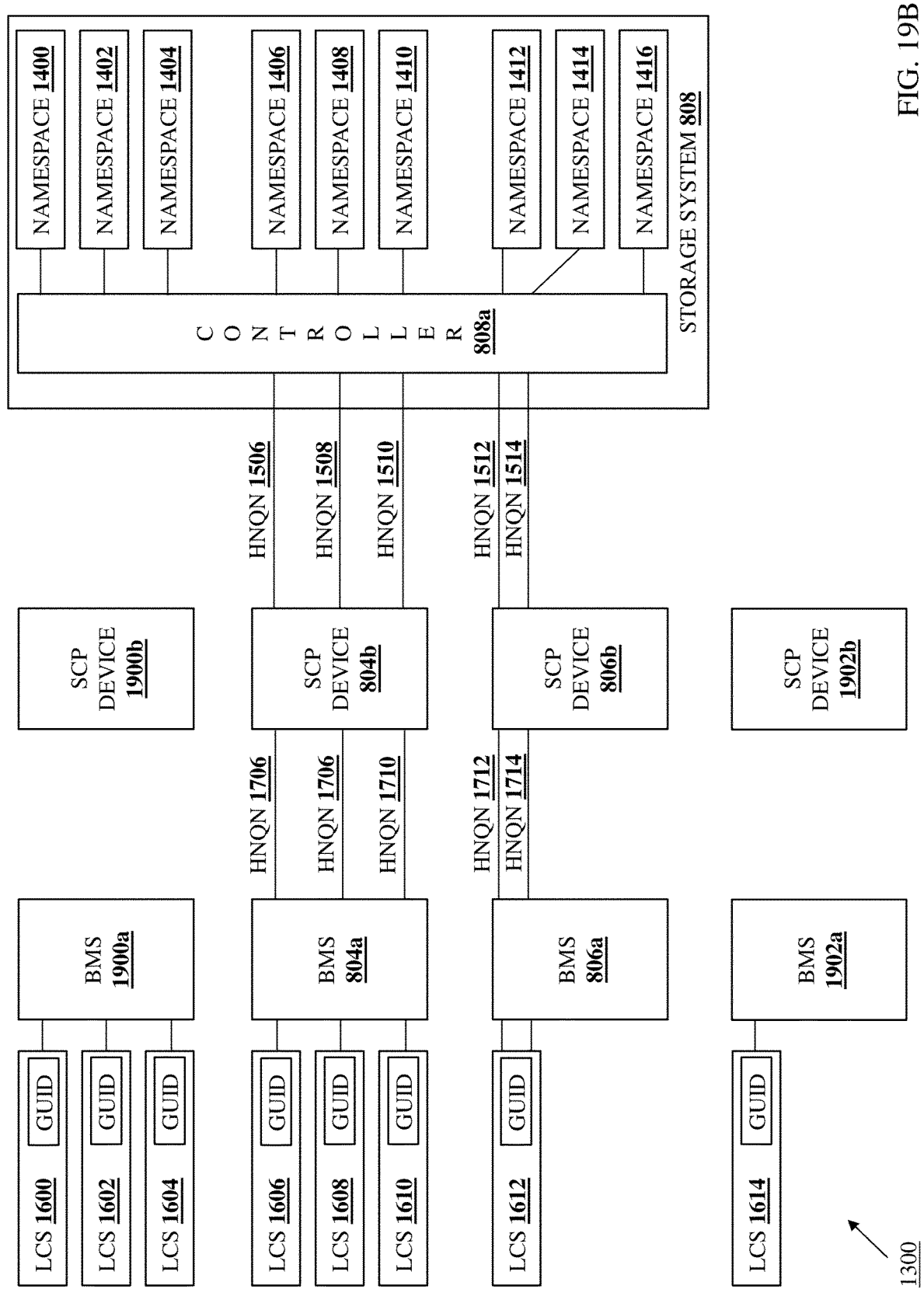
FIG. 19B is a schematic view illustrating an embodiment of the LCS provisioning system of FIG. 8 operating during the method of FIG. 7.

With reference to FIG. 19A, at block 908 in this third embodiment of the method 900 and in response to determining that the LCSs 1600, 1602, 1604, and 1614 require movement to a new host system, the resource management engine in the resource management system may perform LCS movement operations that include removing the LCSs 1600, 1602, and 1604 from the BMS 802a and removing the LCS 1614 from the BMS 806a. With reference to FIG. 19B, the LCS movement operations may also include providing the LCSs 1600, 1602, and 1604 using a BMS 1900a that is coupled to the storage system by an SCP device 1900b similarly as described above for the BMS 802a/SCP device 802b combination, the BMS 804a/SCP device 804b combination, and the BMS 806a/SCP device 806b combination, and providing the LCS 1614 using a BMS 1902a that is coupled to the storage system by an SCP device 1902b similarly as described above for the BMS 802a/SCP device 802b combination, the BMS 804a/SCP device 804b combination, and the BMS 806a/SCP device 806b combination host system 704.

One of skill in the art in possession of the present disclosure will appreciate how the LCSs 1600, 1602, and 1604 may be removed from the BMS 802a and provided using the BMS 1900a similarly as described above (e.g., using any resource devices including the using CPU device (s) and memory system(s) in the BMS 1900a, resources in the SCP device 1900b, and/or using any other LCS provisioning operations that would be apparent to one of skill in the art in possession of the present disclosure), as well as how the LCS 1614 may be removed from the BMS 806a and provided using the BMS 1902a similarly as described above (e.g., using any resource devices including the using CPU device(s) and memory system(s) in the BMS 1902a, resources in the SCP device 1902b, and/or using any other LCS provisioning operations that would be apparent to one of skill in the art in possession of the present disclosure).

Figure 19C:
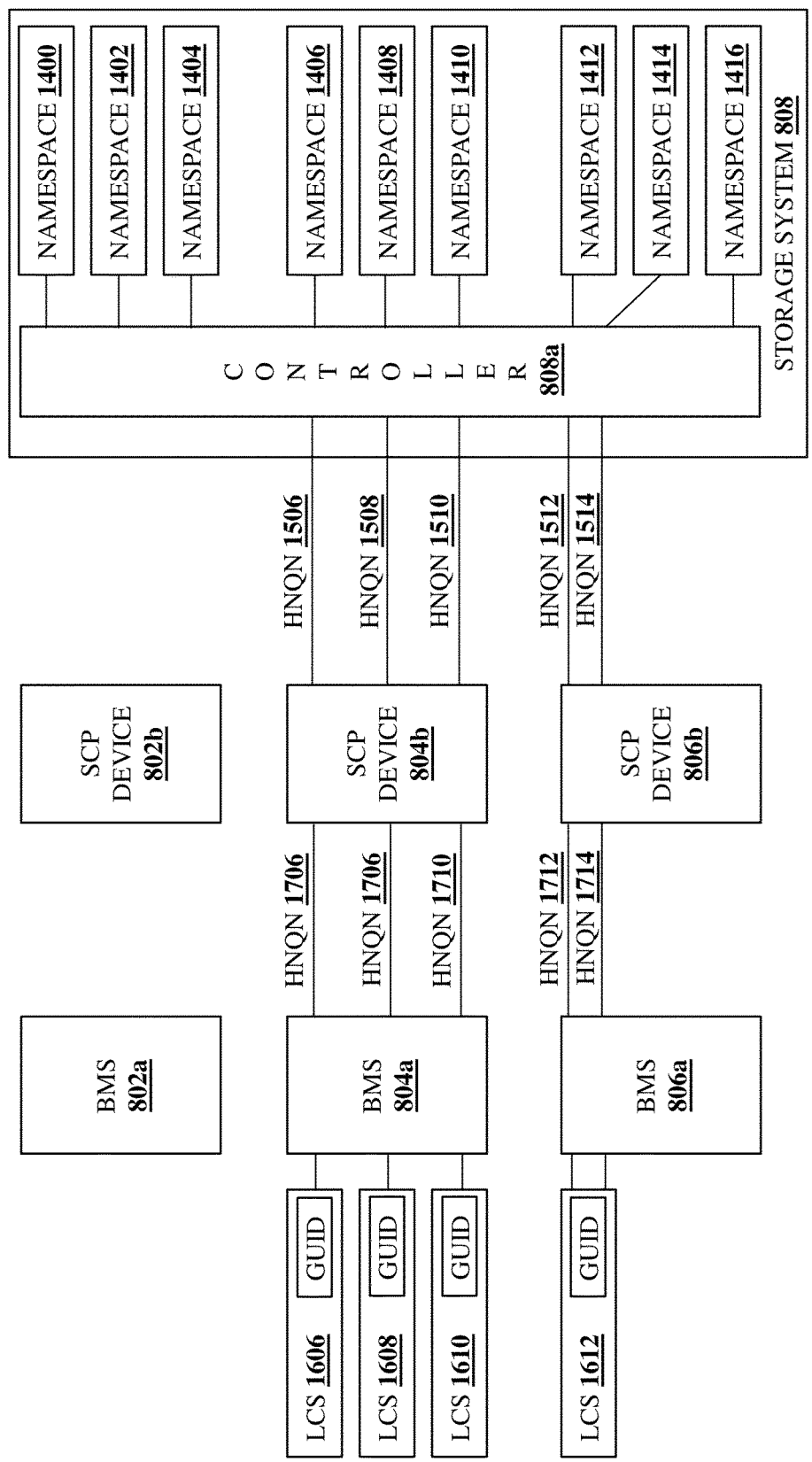
FIG. 19C is a schematic view illustrating an embodiment of the LCS provisioning system of FIG. 8 operating during the method of FIG. 7.

The method 900 then proceeds to block 910 where the resource management system removes the first HNQN(s) from the storage controller and the first host system. With reference to FIG. 19C, at block 910 in this third embodiment of the method 900, the resource management engine in the resource management system may perform HNQN removal operations that include erasing, deleting, and/or otherwise removing the HNQN(s) 1500, 1502, and 1504 from the storage controller 808a and the SCP device 802b, as well as erasing, deleting, and/or otherwise removing the HNQN(s) 1700, 1702, and 1704 from the SCP device 802b and BMS 802a (which were used to present the namespaces 1400, 1402, and 1404, respectively, provided by the storage system 808 to the LCSs 1600, 1602, and 1604, respectively), which one of skill in the art in possession of the present disclosure will subsequently prevent the storage controller 808a from accessing the LCSs 1600, 1602, and 1604 via the HNQN(s) 1500/1700, 1502/1702, and 1504/1704.

Similarly, the HNQN removal operations performed by the resource management engine may include erasing, deleting, and/or otherwise removing the HNQN 1516 from the storage controller 806a and the SCP device 806b, as well as erasing, deleting, and/or otherwise removing the HNQN 1716 from the SCP device 806b and BMS 806a (which were used to present the namespaces 1416 provided by the storage system 808 to the LCS 1614), which one of skill in the art in possession of the present disclosure will subsequently prevent the storage controller 808a from accessing the LCS 1614 via the HNQNs 1516/1716

Figure 19D:
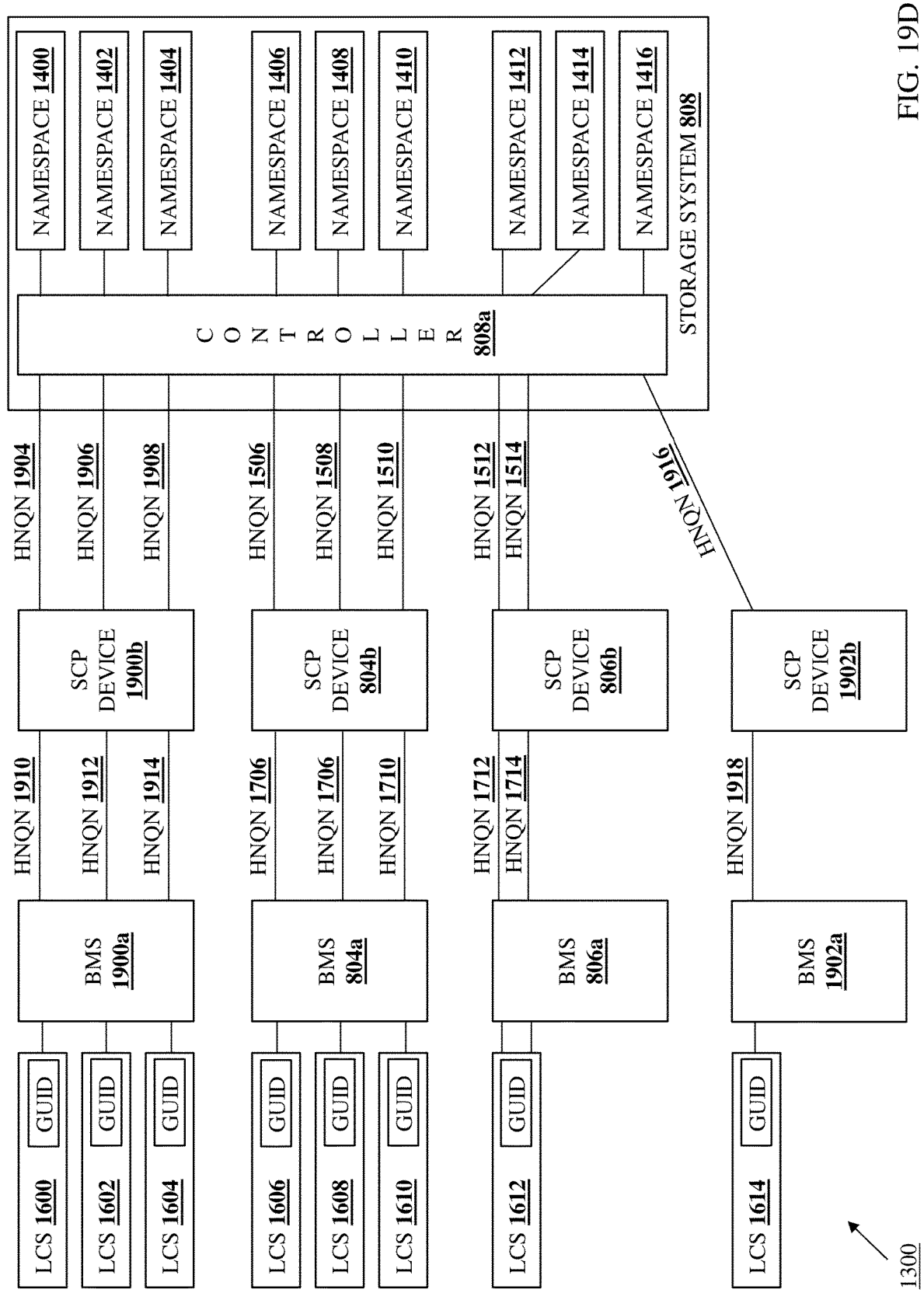
FIG. 19D is a schematic view illustrating an embodiment of the LCS provisioning system of FIG. 8 operating during the method of FIG. 7.

The method 900 then proceeds to block 912 where the resource management system configures the second host system and the storage controller in the storage system to present the namespace provided by the storage system to the LCS via second HNQN(s). With reference to FIG. 19D, at block 912 in this third embodiment of the method 900, the resource management engine in the resource management system may perform HNQN provisioning operations that include configuring the storage controller 808a and the SCP device 1900b to present the namespaces 1400, 1402, and 1404, respectively, provided by the storage system 808 to the LCSs 1600, 1602, and 1604, respectively, using HNQNs 1904, 1906, and 1908; and configuring the BMS 1900a and the SCP device 1900b to present the namespaces 1400, 1402, and 1404, respectively, provided by the storage system 808 to the LCSs 1600, 1602, and 1604, respectively, using HNQNs 1910, 1912, and 1914, respectively, and one of skill in the art in possession of the present disclosure will appreciate how the HNQNs 1904, 1906, and 1908 may have been pre-provisioned on the SCP device 1900b or generated on-the-fly as described above.

As such, one of skill in the art in possession of the present disclosure will appreciate how the HNQN(s) 1904, 1906, and 1908 coupling the SCP device 1900b to the namespaces 1400, 1402, and 1404, respectively, and the HNQN(s) 1910, 1912, and 1914 coupling the BMS 1900a to the SCP device 1900b, respectively, in FIG. 19D may be stored in and/or otherwise utilized by the storage controller 808, the SCP device 1900b, and the BMS 1900a to present those namespaces 1400, 1402, and 1404 to the LCSs 1600, 1602, and 1604, respectively, as described below.

Similarly, at block 912 in this third embodiment of the method 900, the resource management engine in the resource management system may perform HNQN provisioning operations that include configuring the storage controller 808*a* and the SCP device 1902*b* to present the namespace 1416 provided by the storage system 808 to the LCS 1614 using HNQN 1916; and configuring the BMS 1902*a* and the SCP device 1902*b* to present the namespace 1416 provided by the storage system 808 to the LCS 1614 using HNQN 1918, and one of skill in the art in possession of the present disclosure will appreciate how the HNQN 1916 may have been pre-provisioned on the SCP device 1902*b* or generated on-the-fly as described above. As such, one of skill in the art in possession of the present disclosure will appreciate how the HNQN 1916 coupling the SCP device 1902*b* to the namespace 1416, and the HNQN 1918 coupling the BMS 1902*a* to the SCP device 1902*b* in FIG. 19D may be stored in and/or otherwise utilized by the storage controller 808*a*, the SCP device 1902*b*, and the BMS 1902*a* to present that namespaces 1416 to the LCS 1614 as described below.

Similarly as described above, the HNQN 1910 may be configured to provide a QoS required by the LCS 1600 (e.g., the same QoS configured for the HNQN 1700 as described above, a different QoS than was configured for the HNQN 1700 as described above (e.g., when requirements of the LCS 1600 have changed), etc.), which one of skill in the art in possession of the present disclosure will appreciate may configure the HNQN 1910 to cause the BMS 1900*a* to provide processing resources, memory resources, and/or other resources in the BMS 1900*a* that will satisfy the QoS required by the LCS 1600, and cause the SCP device 1900*b* to provide processing resources, memory resources, networking resources, and/or other resources in the SCP device 1900*b* that will satisfy the QoS required by the LCS 1600. Similarly, the HNQN 1904 may be configured to provide a QoS required by the LCS 1600 (e.g., the same QoS configured for the HNQN 1500 as described above, a different QoS than was configured for the HNQN 1500 as described above (e.g., when requirements of the LCS 1600 have changed), etc.), which one of skill in the art in possession of the present disclosure will appreciate may configure the HNQN 1700 to cause the SCP device 1900*b* to provide processing resources, memory resources, networking resources, and/or other resources in the SCP device 1900*b* that will satisfy the QoS required by the LCS 1600, and cause the cause the storage controller 808*a* to provide processing resources, memory resources, networking resources, storage resources, and/or other resources in the storage system 808 that will satisfy the QoS required by the LCS 1600.

While not described in detail, one of skill in the art in possession of the present disclosure will appreciate how the HNQNs 1906 and 1912 may be configured to provide a QoS required by the LCS 1602, the HNQNs 1908 and 1914 may be configured to provide a QoS required by the LCS 1604, and the HNQNs 1916 and 1918 may be configured to provide a QoS required by the LCS 1614, similarly as described above for the HNQNs 1904 and 1910/LCS 1600 discussed above.

Thus, systems and methods have been described that utilize HNQN "leases" for presenting a namespace in a storage system to an LCS via the provisioning of "new" HNQN(s) each time that LCS is moved to a "new" host system, and the removal of "old" HNQN(s) from its "old" host system. For example, the LCS-NVMe/TCP storage target system includes a storage system having a storage controller, host systems that are coupled to the storage system, and a resource management system that is coupled to the storage system and the host systems. The resource management system provides a first LCS using a first host system, and configures the first host system and the storage controller to present a first namespace provided by the storage system to the first LCS via first Host NVMe Qualified Name(s) (HNQN(s)). The resource management system then moves the first LCS to a second host system, removes the at least one first HNQN from the storage controller and the first host system, and configures the second host system and the storage controller to present the first namespace provided by the storage system to the first LCS via second HNQN(s). As such, an LCS may move between different host systems while that LCS continues to use the same NVMe/TCP storage target in a storage system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Logically Composed System (LCS)/Non-Volatile Memory express (NVMe)-Transmission Control Protocol (TCP) storage target system, comprising:
 a storage system including a storage controller;
 a plurality of host systems that are coupled to the storage system; and
 a resource management system that is coupled to the storage system and the plurality of host systems, wherein the resource management system is configured to:
  provide a first Logically Composed System (LCS) using a first host system included in the plurality of host systems;
  configure the first host system and the storage controller to present a first namespace provided by the storage system to the first LCS via at least one first Host NVMe Qualified Name (HNQN);
  move the first LCS to a second host system included in the plurality of host systems;
  remove the at least one first HNQN from the storage controller and the first host system; and
  configure the second host system and the storage controller to present the first namespace provided by the storage system to the first LCS via at least one second HNQN that is different than the at least one first HNQN.

2. The system of claim 1, wherein the first host system includes a first Bare Metal Server (BMS) and a first System Control Processor (SCP) device, the second host system includes a second BMS and a second SCP device, the at least one first HNQN includes a first BMS/SCP device HNQN and a first SCP/storage HNQN, and the at least one second HNQN includes a second BMS/SCP device HNQN and a second SCP/storage HNQN.

3. The system of claim 2, wherein the resource management system is configured to:
 map the first LCS to the first namespace using a Globally Unique IDentifier (GUID) for the first LCS and the at least one first HNQN to configure the first host system and the storage controller to present the first namespace to the first LCS; and
 map the first LCS to the first namespace using the GUID for the first LCS and the at least one second HNQN to configure the second host system and the storage controller to present the first namespace to the first LCS.

4. The system of claim 2, wherein the resource management system is configured to:
pre-provision the first SCP/storage HNQN to the storage controller and the first SCP device prior to providing the first LCS using the first host system; and
pre-provision the second SCP/storage HNQN to the storage controller and the second SCP device prior to providing the first LCS using the second host system.

5. The system of claim 1, wherein the removing the at least one first HNQN from the storage controller and the first host system prevents the storage controller from accessing the first LCS via the at least one first HNQN.

6. The system of claim 1, wherein the resource management system is configured to:
configure the at least one first HNQN to provide a first Quality of Service (QOS) for the first LCS, and
configure the at least one second HNQN to provide the first QoS for the first LCS.

7. An Information Handling System (IHS), comprising:
a resource management processing system; and
a resource management memory system that is coupled to the resource management processing system and that includes instructions that, when executed by the resource management processing system, cause the resource management processing system to provide a resource management engine that is configured to:
provide a first Logically Composed System (LCS) using a first host system that is coupled to the resource management processing system;
configure the first host system and a storage controller in a storage system that is coupled to the resource management processing system to present a first namespace provided by the storage system to the first LCS via at least one first Host NVMe Qualified Name (HNQN);
move the first LCS to a second host system that is coupled to the resource management processing system;
remove the at least one first HNQN from the storage controller and the first host system; and
configure the second host system and the storage controller to present the first namespace provided by the storage system to the first LCS via at least one second HNQN that is different than the at least one first HNQN.

8. The IHS of claim 7, wherein the first host system includes a first Bare Metal Server (BMS) and a first System Control Processor (SCP) device, the second host system includes a second BMS and a second SCP device, the at least one first HNQN includes a first BMS/SCP device HNQN and a first SCP/storage HNQN, and the at least one second HNQN includes a second BMS/SCP device HNQN and a second SCP/storage HNQN.

9. The IHS of claim 8, wherein the resource management engine is configured to:
map the first LCS to the first namespace using a Globally Unique IDentifier (GUID) for the first LCS and the at least one first HNQN to configure the first host system and the storage controller to present the first namespace to the first LCS; and
map the first LCS to the first namespace using the GUID for the first LCS and the at least one second HNQN to configure the second host system and the storage controller to present the first namespace to the first LCS.

10. The IHS of claim 7, wherein the resource management engine is configured to:
pre-provision the first SCP/storage HNQN to the storage controller and the first SCP device prior to providing the first LCS using the first host system; and
pre-provision the second SCP/storage HNQN to the storage controller and the second SCP device prior to providing the first LCS using the second host system.

11. The IHS of claim 7, wherein the removing the at least one first HNQN from the storage controller and the first host system prevents the storage controller from accessing the first LCS via the at least one first HNQN.

12. The IHS of claim 7, wherein the resource management engine is configured to:
configure the at least one first HNQN to provide a first Quality of Service (QOS) for the first LCS, and
configure the at least one second HNQN to provide the first QoS for the first LCS.

13. The IHS of claim 7, wherein the resource management engine is configured to:
provide a second LCS using the first host system that is providing the first LCS;
configure the first host system and the storage controller in the storage system to present a second namespace provided by the storage system to the second LCS via at least one third HNQN.

14. A method for providing storage for a Logically Composed System (LCS) using Non-Volatile Memory express (NVMe)-Transmission Control Protocol (TCP) storage targets, comprising:
providing, by a resource management system, a first Logically Composed System (LCS) using a first host system;
configuring, by the resource management system, the first host system and a storage controller in a storage system to present a first namespace provided by the storage system to the first LCS via at least one first Host NVMe Qualified Name (HNQN);
moving, by the resource management system, the first LCS to a second host system;
removing, by the resource management system, the at least one first HNQN from the storage controller and the first host system; and
configuring, by the resource management system, the second host system and the storage controller to present the first namespace provided by the storage system to the first LCS via at least one second HNQN that is different than the at least one first HNQN.

15. The method of claim 14, wherein the first host system includes a first Bare Metal Server (BMS) and a first System Control Processor (SCP) device, the second host system includes a second BMS and a second SCP device, the at least one first HNQN includes a first BMS/SCP device HNQN and a first SCP/storage HNQN, and the at least one second HNQN includes a second BMS/SCP device HNQN and a second SCP/storage HNQN.

16. The method of claim 14, further comprising:
mapping, by the resource management system, the first LCS to the first namespace using a Globally Unique IDentifier (GUID) for the first LCS and the at least one first HNQN to configure the first host system and the storage controller to present the first namespace to the first LCS; and
mapping, by the resource management system, the first LCS to the first namespace using the GUID for the first LCS and the at least one second HNQN to configure the second host system and the storage controller to present the first namespace to the first LCS.

17. The method of claim 14, further comprising:
pre-provisioning, by the resource management system, the first SCP/storage HNQN to the storage controller and the first SCP device prior to providing the first LCS using the first host system; and
pre-provisioning, by the resource management system, the second SCP/storage HNQN to the storage controller and the second SCP device prior to providing the first LCS using the second host system.

18. The method of claim 14, wherein the removing the at least one first HNQN from the storage controller and the first host system prevents the storage controller from accessing the first LCS via the at least one first HNQN.

19. The method of claim 14, further comprising:
configuring, by the resource management system, the at least one first HNQN to provide a first Quality of Service (QOS) for the first LCS, and
configuring, by the resource management system, the at least one second HNQN to provide the first QoS for the first LCS.

20. The method of claim 14, further comprising:
providing, by the resource management system, a second LCS using the first host system that is providing the first LCS;
configuring, by the resource management system, the first host system and the storage controller in the storage system to present a second namespace provided by the storage system to the second LCS via at least one third HNQN.

* * * * *